US011117289B2

(12) United States Patent
Smith et al.

(10) Patent No.: US 11,117,289 B2
(45) Date of Patent: Sep. 14, 2021

(54) STORAGE AND DELIVERY SYSTEMS FOR COLLOIDAL DISPERSIONS

(71) Applicant: Nantero, Inc., Woburn, MA (US)

(72) Inventors: Billy Smith, Woburn, MA (US); David Cook, Salem, NH (US); David A. Roberts, Woburn, MA (US); Thomas R. Bengtson, Derry, NH (US)

(73) Assignee: Nantero, Inc., Woburn, MA (US)

( * ) Notice: Subject to any disclaimer, the term of this patent is extended or adjusted under 35 U.S.C. 154(b) by 487 days.

(21) Appl. No.: 15/653,808

(22) Filed: Jul. 19, 2017

(65) Prior Publication Data
US 2018/0345538 A1 Dec. 6, 2018

Related U.S. Application Data

(60) Provisional application No. 62/515,740, filed on Jun. 6, 2017.

(51) Int. Cl.
| B29B 13/00 | (2006.01) |
| B65D 41/04 | (2006.01) |
| B65D 41/62 | (2006.01) |
| B29C 41/24 | (2006.01) |
| B05D 1/00 | (2006.01) |
| B65D 47/12 | (2006.01) |
| B05D 3/00 | (2006.01) |
| B65D 51/18 | (2006.01) |
| B65D 51/16 | (2006.01) |
| B65D 81/24 | (2006.01) |

(Continued)

(52) U.S. Cl.
CPC ............ *B29B 13/00* (2013.01); *B05C 1/00* (2013.01); *B05D 1/005* (2013.01); *B05D 3/002* (2013.01); *B29C 41/24* (2013.01); *B65D 41/04* (2013.01); *B65D 41/62* (2013.01); *B65D 47/122* (2013.01); *B65D 51/1616* (2013.01); *B65D 51/18* (2013.01); *B65D 81/24* (2013.01); *B29B 2013/005* (2013.01); *B29L 2007/008* (2013.01)

(58) Field of Classification Search
CPC ..................................................... B29B 13/00
See application file for complete search history.

(56) References Cited

U.S. PATENT DOCUMENTS

| 7,736,591 B2 | 6/2010 | Rose et al. |
| 9,073,028 B2 | 7/2015 | Hovinen et al. |
| (Continued) | | |

Primary Examiner — Larry W Thrower
(74) Attorney, Agent, or Firm — Nantero, Inc.

(57) ABSTRACT

The present disclosure provides methods for stabilizing a colloidal dispersion during transport for low defect tolerance applications. The methods involve eliminating fluid interfaces within a dispersion, storing the dispersion in an environment of inert gas, and degassing the dispersion. Several bottle closure devices are described which may be ideal for use with these methods, being able to seal a container filled with a dispersion, permit the removal of headspace and rapidly empty the contained dispersion. In one aspect, the device includes a vented cap and semi-permeable membrane, which allows the passage of gas into and out of the container, and a dispenser nozzle integrated with the device to allow a stored dispersion to be dispensed without removing the device from the container. In another aspect, the bottle closure device includes an attachment point for a removable downtube and dispenser nozzle.

20 Claims, 27 Drawing Sheets

(51) Int. Cl.
   *B05C 1/00* (2006.01)
   *B29L 7/00* (2006.01)

(56) References Cited

U.S. PATENT DOCUMENTS

| | | |
|---|---|---|
| 9,696,730 B2 | 7/2017 | Bertucci et al. |
| 2009/0258850 A1* | 10/2009 | Frincke ............... A61K 9/0019 514/182 |

* cited by examiner

Standard Bottle (20mL headspace) – 19hr shake
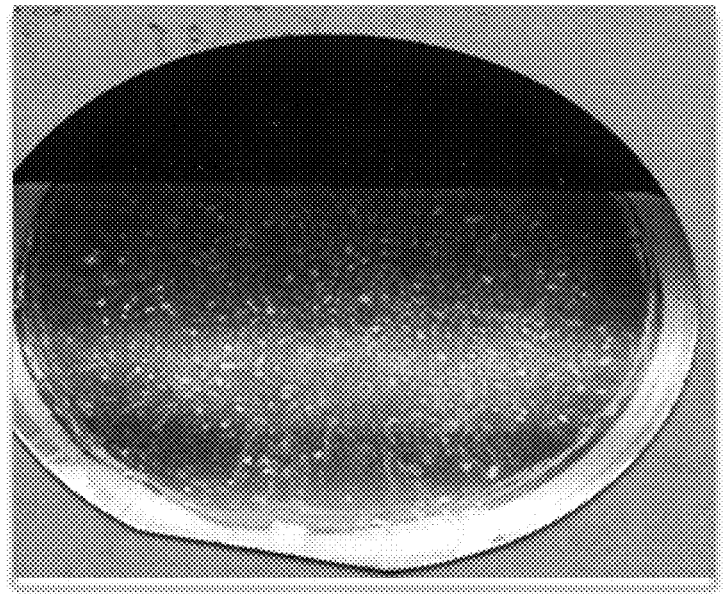
Syringe (No Headspace) – 19hr shake
FIG. 1B Fill Cap Belt Tighten Invert Cap & Seal

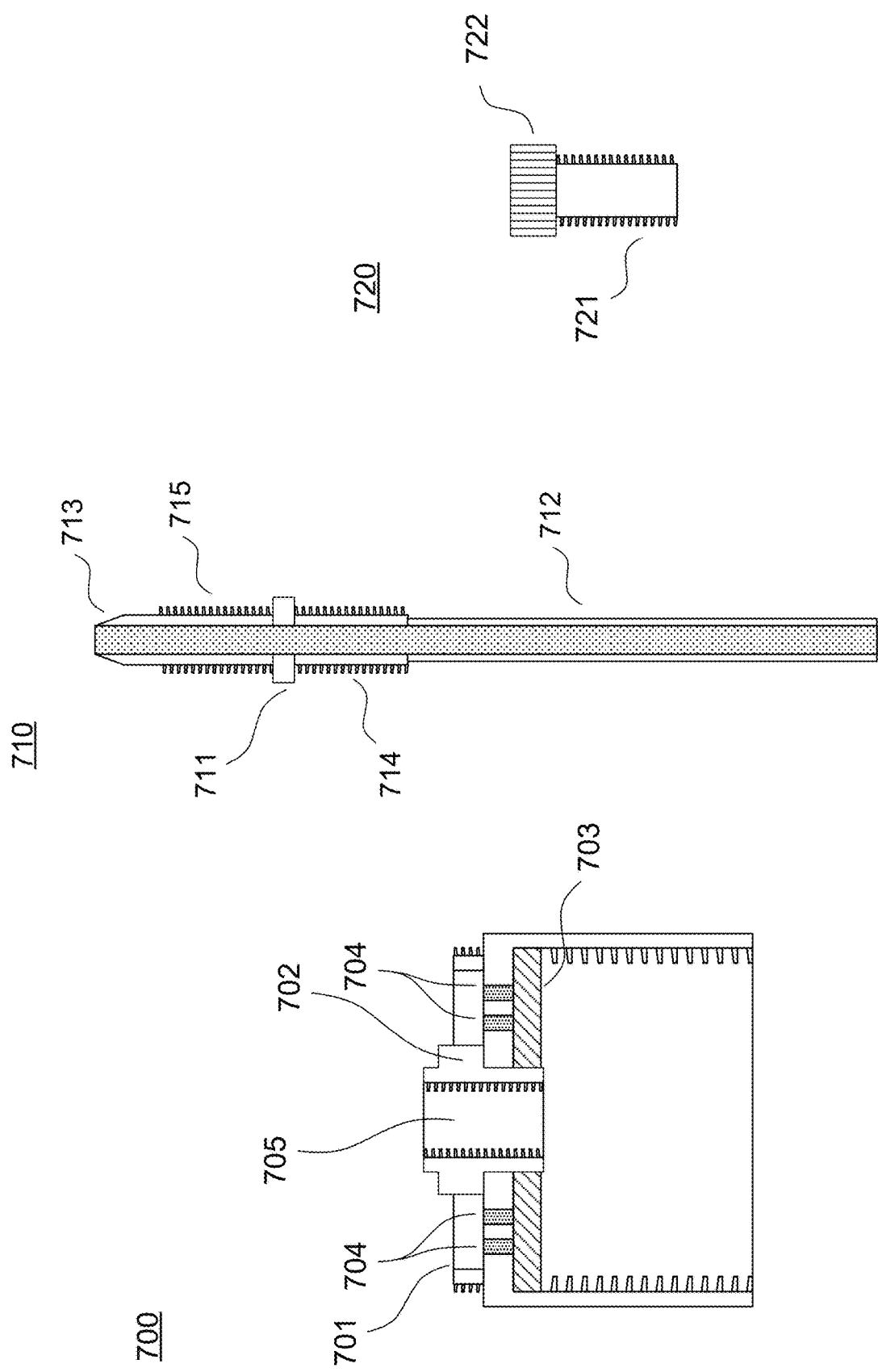

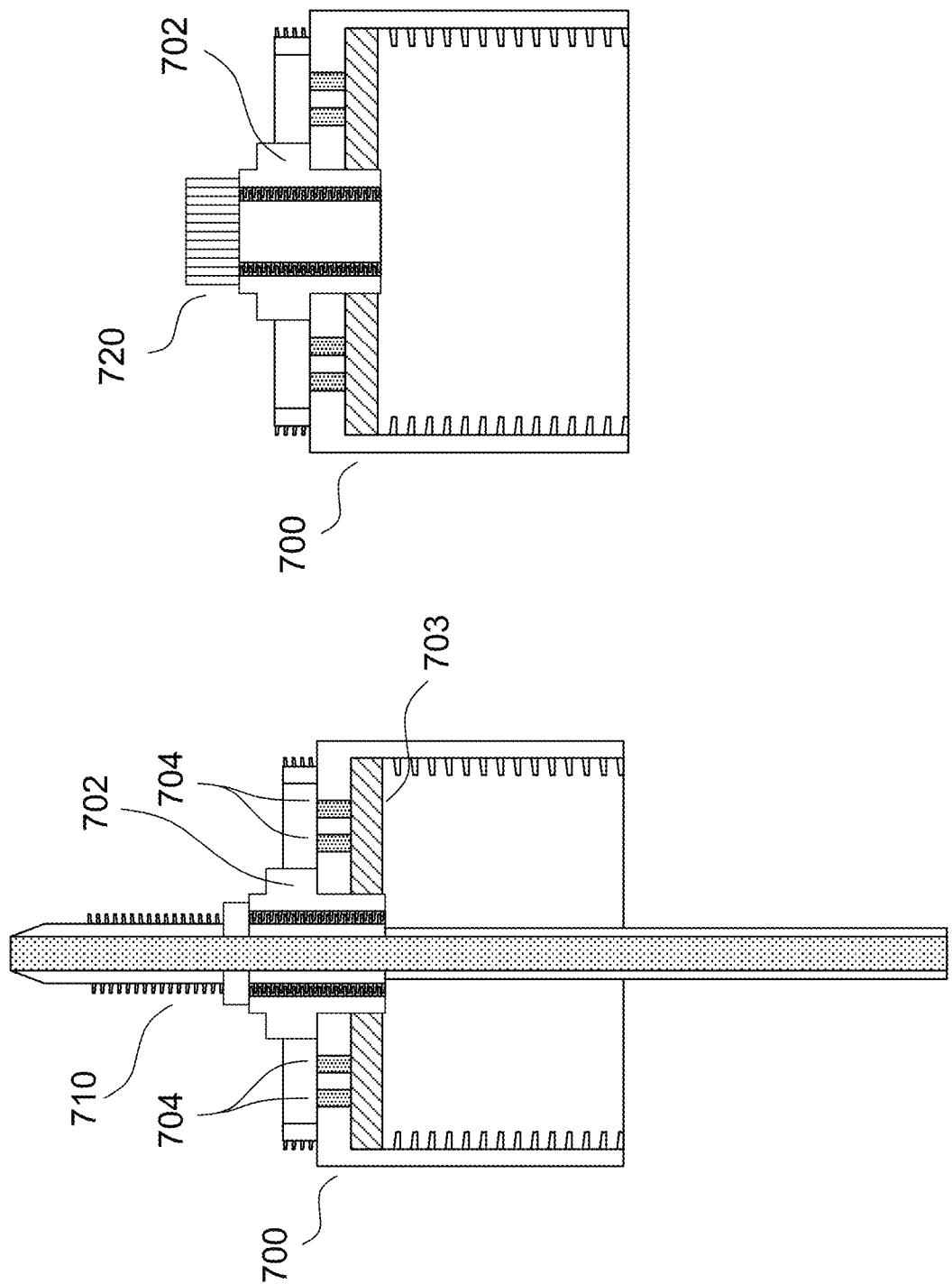

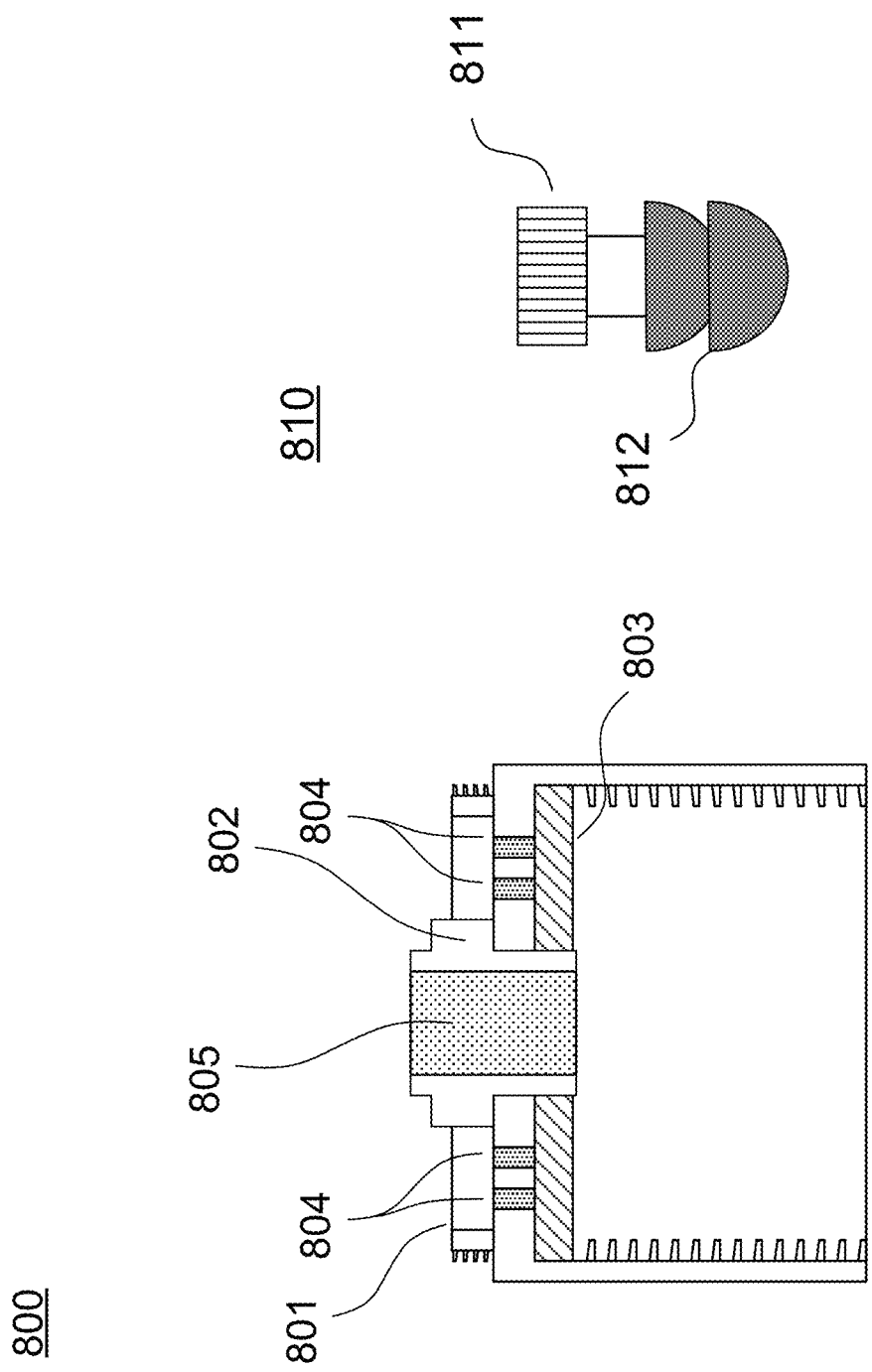

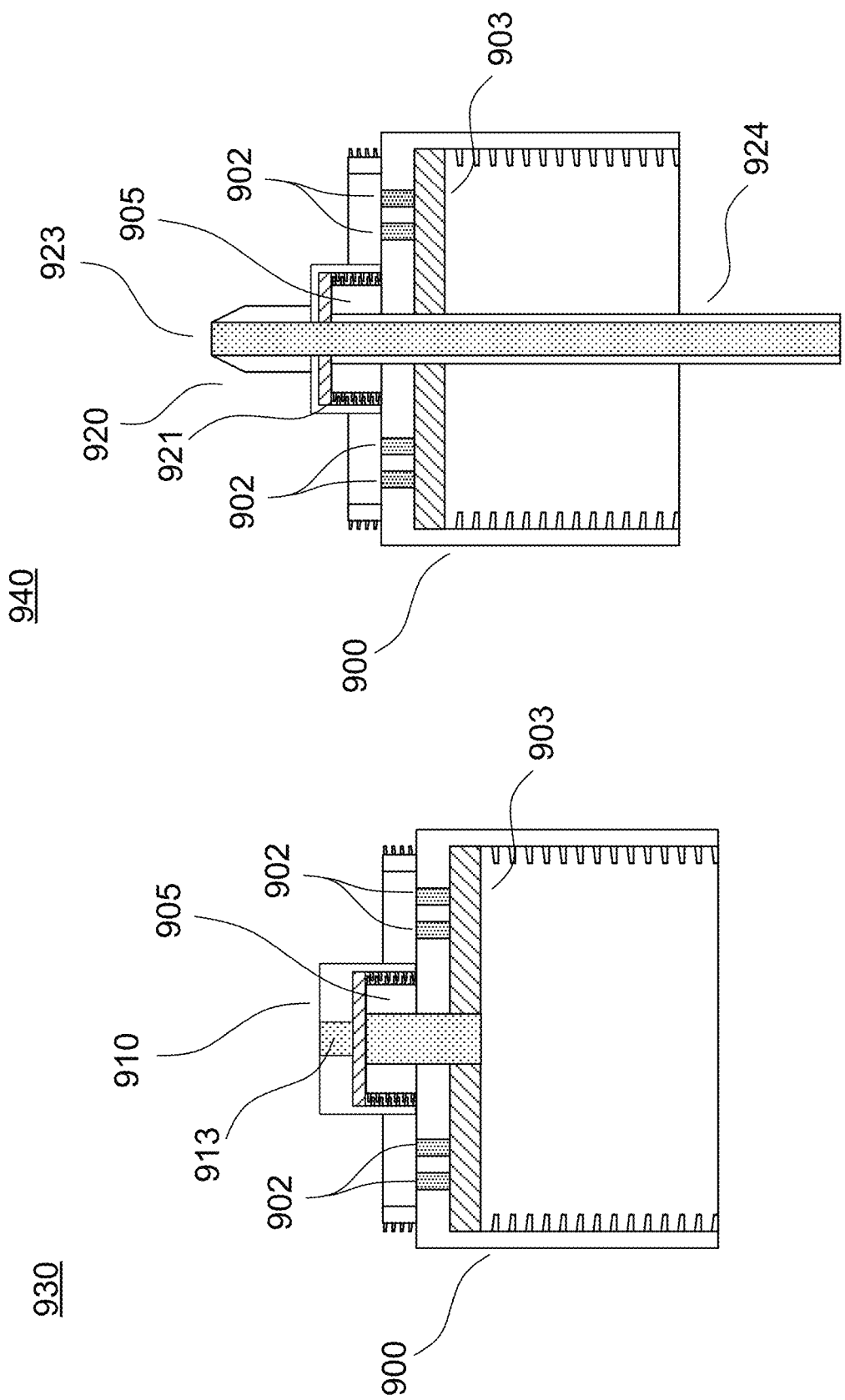

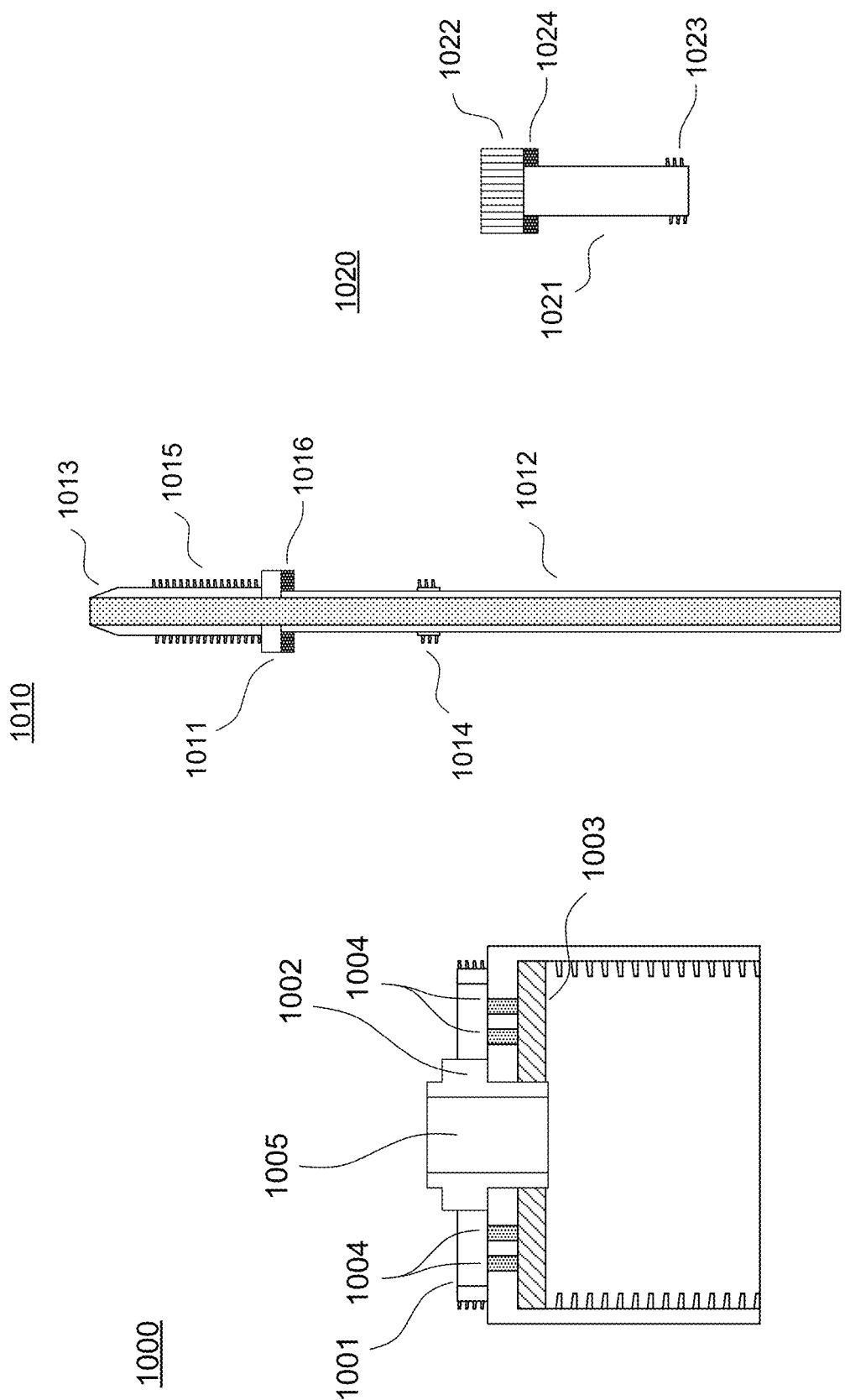

STORAGE AND DELIVERY SYSTEMS FOR COLLOIDAL DISPERSIONS

CROSS-REFERENCE TO RELATED APPLICATIONS

This application claims priority to U.S. Provisional Patent Application 62/515,740, Jun. 6, 2017 entitled "Storage and Delivery System for Chemical Formulations Using Semipermeable Membranes" the contents of which are incorporated by references herein in their entirety.

This application relates to the following U.S. patents, which are assigned to the assignee of this application, and are hereby incorporated by reference in their entirety:

Methods of Making Carbon Nanotube Films, Layers, Fabrics, Ribbons, Elements, and Articles (U.S. Pat. No. 7,566,478), filed Jan. 13, 2003;

Spin-Coatable Liquid for Formation of High Purity Nanotube Films (U.S. Pat. No. 7,375,369), filed Jun. 3, 2004;

Two-Terminal Nanotube Devices And Systems And Methods Of Making Same (U.S. Pat. No. 7,781,862), filed Nov. 15, 2005; and Aqueous Carbon Nanotube Applicator Liquids and Methods for Producing Applicator Liquids Thereof (U.S. Pat. No. 7,666,382), filed Dec. 15, 2005;

This application relates to the following patent applications, which are assigned to the assignee of this application, and are hereby incorporated by reference in their entirety:

Nanotube Solution Treated With Molecular Additive, Nanotube Film Having Enhanced Adhesion Property, And Methods For Forming The Nanotube Solution And The Nanotube Film (U.S. patent Ser. No. 13/416,820), filed Mar. 9, 2012; and Nanotube Solutions With High Concentration And Low Contamination And Methods For Purifying Nanotube Solutions (U.S. patent application Ser. No. 13/825,070), filed Mar. 19, 2013.

TECHNICAL FIELD

The present disclosure relates to storage and delivery systems for colloidal dispersions. More particularly, the present disclosure relates to such storage and delivery systems well-suited for use with colloidal dispersions which experience aggregation and agglomeration during standard transport procedures or long term storage.

BACKGROUND OF THE INVENTION

Any discussion of the related art throughout this specification should in no way be considered as an admission that such art is widely known or forms part of the common general knowledge in the field.

Colloidal dispersions, e.g., milk, paint, inks, and many other dispersed particles in a variety of media, are widely available and useful in the manufacturing of many commercial products. Such colloidal dispersions are typically comprised of heterogeneous mixtures of a dispersed phase particulate in a dispersion medium. These dispersed phase particulates are nanoscopic or microscopically sized particulates of gases, liquids or solids; the latter two typically being polymers, proteins, or other organic/inorganic molecules, which are suspended in a liquid media such as water or an organic solvent. Often, these dispersed materials are critical components within a manufacturing process wherein transportation and application is made easier in a liquid form. For instance, delivery of pigment particles is greatly improved and simplified when delivered in a liquid dispersion, such as paint. A nanotube applicator liquid, consisting of a colloidal dispersion of carbon nanotubes, is an effective vehicle that may be used to form nanotube fabrics and films through spin coating onto a substrate (for example, as described in U.S. Pat. No. 7,375,369 to Sen et al. and U.S. Pat. No. 7,666,382 to Ghenciu et al., both incorporated herein by reference in their entirety). However, unlike typical colloidal particulates, carbon nanotubes possess distinct structural attributes that are expressed in the resulting films which can impart secondary structures to a film beyond the simple chemical composition. This offers the opportunity for self-assembly of very regular arrangements of these nanoscopic elements, however, variations in this regularity are also disruptive to their use in large scale commercial applications, especially for state of the art electronic device thin films, which have a low tolerance for such variations.

Within certain applications, wherein colloidal dispersions require transport and/or storage before they can be used within a manufacturing process, destabilization of the dispersion can become an issue. For example, colloidal dispersions may form aggregates of the normally dispersed particles in the colloid during transport or even upon standing. During the application of these dispersions to form films or coatings, etc. from the dispersed particles, the resultant product is defective with nonuniformities in the structure related to the aggregates. Additionally, shelf life may be an issue within such applications, wherein without careful controls, a dispersion can destabilize to form aggregates prematurely over a period of time in storage.

The use of colloidal dispersions of various nanoparticulate formulations is increasing within state of the art advanced materials applications, particularly in electronics, solar, batteries, and displays. The requirement for very tight control over uniformity in form and the physical properties of materials derived from these dispersions requires improvements in storage and delivery systems that aid in maintaining the purity and stability of these formulations during shipping, storage, and use within manufacturing environments, while additionally providing rapid and direct access to these formulations.

SUMMARY OF THE INVENTION

The present disclosure relates generally to methods and systems to reduce defect formation within colloidal dispersions during transport and storage. In particular, the present disclosure provides methods and systems to remove two dimensional interfaces from a dispersion, including headspace and gas bubbles, and provide an inert environment in order to prevent the formation of agglomerates within a colloidal dispersion during transport and storage.

According to one aspect of the present disclosure, a method for reducing defect formation in a colloidal dispersion comprises providing a colloidal dispersion, placing the dispersion into a container, removing the liquid-gas interfaces within the dispersion, and securing the container to prevent reintroduction of liquid-gas interfaces into the dispersion.

According to another aspect of the present disclosure, removing liquid-gas interfaces from a dispersion comprises removing the headspace from a container.

According to another aspect of the present disclosure, removing liquid-gas interfaces from a dispersion comprises removing bubbles from the dispersion.

According to another aspect of the present disclosure, the filled and secured container is placed into an environment of inert gas.

According to another aspect of the present disclosure, the colloidal dispersion forms agglomerates in response to vibration.

According to another aspect of the present disclosure, the colloidal dispersion is a dispersion of nanoscopic elements.

According to another aspect of the present disclosure, the colloidal dispersion is a dispersion of structured nanoscopic elements.

According to another aspect of the present disclosure, the colloidal dispersion is a dispersion of carbon nanotubes.

According to another aspect of the present disclosure, the colloidal dispersion is degassed prior to being placed into a container, and remains in a degassed state.

According to another aspect of the present disclosure, maintaining the absence of liquid-gas interfaces in the colloidal dispersion prevents the formation of agglomerates.

According to another aspect of the present disclosure, maintaining the absence of liquid-gas interfaces in the colloidal dispersion prevents the formation of defects in a film formed from the colloidal dispersion.

According to another aspect of the present disclosure, the colloidal dispersion free of liquid-gas interfaces is resistant to vibration.

According to another aspect of the present disclosure, the colloidal dispersion free of liquid-gas interfaces is resistant to vibration for a period of between 1 and 5 hours.

According to another aspect of the present disclosure, the colloidal dispersion free of liquid-gas interfaces is resistant to vibration for a period of 5 to 10 hours.

According to another aspect of the present disclosure, the colloidal dispersion free of liquid-gas interfaces is resistant to vibration for a period of 10 to 24 hours.

According to another aspect of the present disclosure, the colloidal dispersion free of liquid-gas interfaces is resistant to vibration for at least 24 hours.

According to another aspect of the present disclosure, the colloidal dispersion is deposited on a material substrate to form a film.

According to another aspect of the present disclosure, a film formed by depositing the colloidal dispersion is a nanotube fabric.

According to another aspect of the present disclosure, the container is a variable volume container.

According to another aspect of the present disclosure, removing the liquid-gas interfaces from a colloidal dispersion comprises reducing the volume of the container.

The present disclosure also provides a storage and delivery system, comprising a storage vessel, a bottle closure device with an access port, and an access port closure mechanism, wherein the bottle closure device seals the storage vessel and the access port closure mechanism seals the access port, the bottle closure device permits the removal of liquid-gas interfaces, and the access port permits the removal of a contained chemical formulation.

Other features and advantages of the present invention will become apparent from the following description of the invention which is provided below in relation to the accompanying drawings.

BRIEF DESCRIPTION OF THE DRAWINGS

FIG. 1B depicts a cross sectional view of a dispenser nozzle cap according to the methods of the present disclosure suitable for use with the bottle closure device of FIG. 1A.

FIG. 7A depicts a first bottle closure device which permits the use of a removable downtube, comprising a primary cap ring, universal attachment with an internal threaded attachment, semi-permeable membrane and vents.

FIG. 7B depicts an exemplary removable downtube having a main body, downtube, dispenser nozzle, bottle closure attachment and dispenser cap attachment.

FIG. 7C depicts an exemplary closure cap comprising a closure device attachment and closure knob.

FIG. 7D depicts the bottle closure device of FIG. 7A configured for point of use operation.

FIG. 7E depicts the bottle closure device of FIG. 7A configured for transport and storage.

FIG. 8A illustrates a second bottle closure device which permits the use of a removable downtube, comprising a primary cap ring, universal attachment with a smooth bore, semi-permeable membrane, and vents.

FIG. 8B illustrates an exemplary closure cap comprising a main body and one or several sealant rings.

FIG. 9F depicts a storage and delivery system in a state suitable for transport and storage, wherein the closure cap of FIG. 9B has been interfaced with the bottle closure device of FIG. 9A.

FIG. 9G depicts a storage and delivery system in a state suitable for dispensing and filling operations, wherein the removable downtube of FIG. 9D has been interfaced with the bottle closure device of FIG. 9A.

FIG. 10A depicts a fourth bottle closure device for use with removable fittings which is devoid of a removable fitting attachment mechanism, comprising a primary cap attachment, universal attachment, semi-permeable membrane, vents and an access port.

FIG. 10B depicts an exemplary removable downtube for use with the bottle closure device of FIG. 10A, comprising a main body, downtube, dispenser nozzle, bottle closure device attachment, dispenser cap attachment and sealant ring.

FIG. 10C depicts an exemplary closure cap for use with the bottle closure device of FIG. 10A, comprising a main body, closure knob, bottle closure device attachment and a sealant ring.

DETAILED DESCRIPTION

Figure 1A:
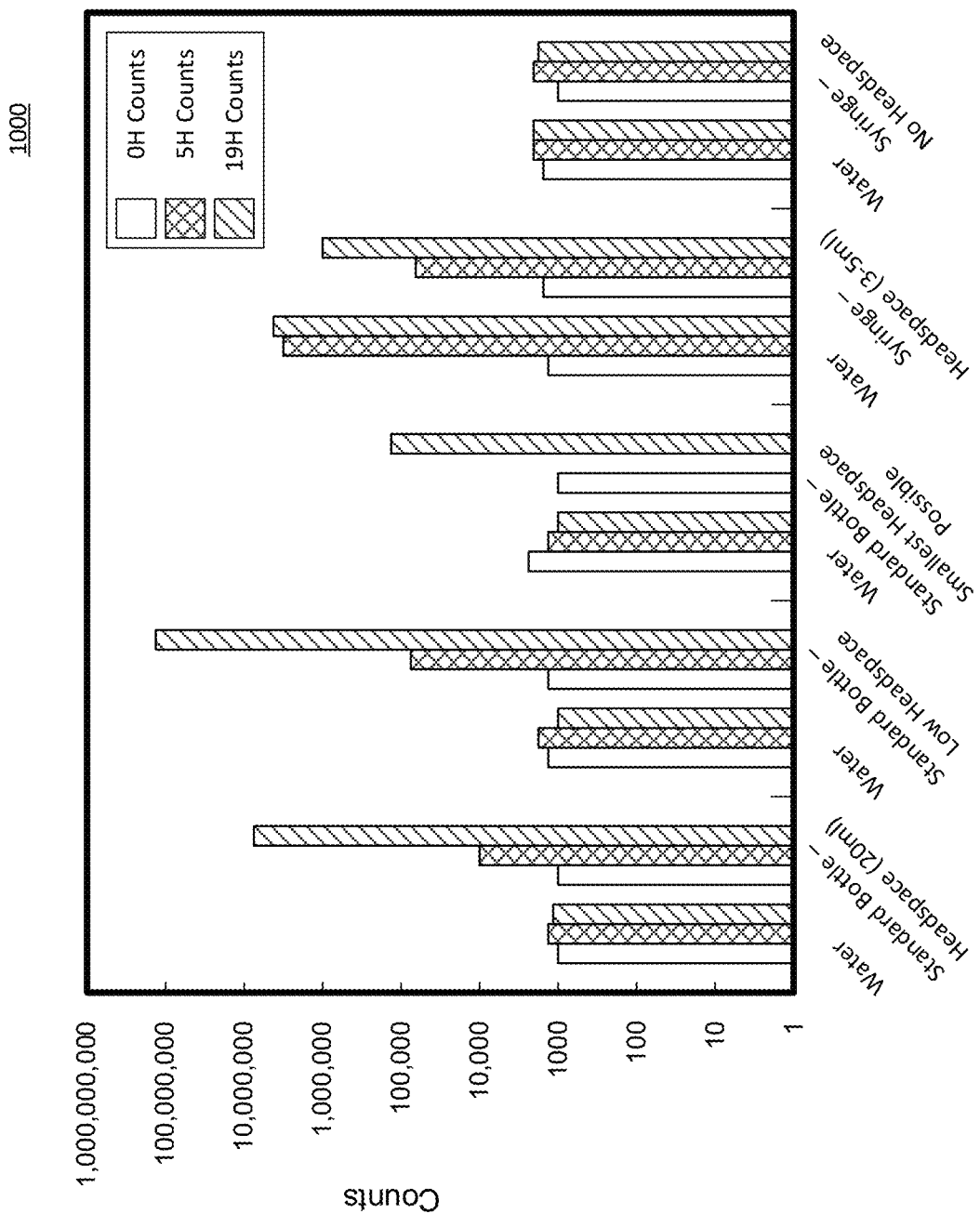
FIG. 1A depicts a cross sectional view of a first bottle closure device according to the methods of the present disclosure that includes a semi-permeable membrane, vents, a down tube and a dispenser nozzle.

The present disclosure teaches methods for maintaining the stability of a colloidal dispersion of nanoscopic elements during transport and storage. Specifically, the present disclosure is directed towards storage and delivery methods which may prevent the introduction of defects into a secondary product, for instance, a nanotube fabric formed from a nanotube dispersion, by preventing and mitigating aggregation of the dispersed nanoscopic particulates. This is accomplished by substantially eliminating the presence of phase interfaces, particularly liquid-gas interfaces, within a storage container filled with a colloidal dispersion, which in some cases may provide a nucleation site for such aggregation. Additional methods, including stabilizing the pH and degassing the dispersion prior to filling a container, may provide a further benefit to shelf-life and stability of a dispersion.

In many cases the level of aggregation experienced by a given colloidal dispersion during transport may be minimal or easily corrected. Paint, for instance, is a colloidal dispersion of pigment particles which is highly stable and may be transported in an ordinary container following standard transport procedures. Stirring the paint before use can break up most agglomerates that may form and re-disperse the particles into solution to a level sufficient for its application. Certain dispersions, however, are more sensitive to the vibration and conditions during transport—such as the nanotube applicator solutions disclosed in U.S. Pat. Nos. 7,375,569 and 7,666,382, both of which are included herein by reference in their entirety—and certain applications of these dispersions may have a substantially lower tolerance for the presence of such agglomerates.

For these dispersions, which often include nanoscopic elements (e.g. carbon nanotubes) for use in state-of-the-art applications such as CMOS manufacturing, normal shipping methods, and even advanced shipping methods, are insufficient to ensure that the dispersion arrives at its destination in a state suitable for its intended application. To address the inability of current transport methods to achieve the high degree of uniformity and stability required for certain low tolerance applications, the present disclosure teaches methods to maintain the stability of a colloidal dispersion of nanoscopic elements during transport and storage which is sensitive to the conditions experienced during transport.

It should be noted that, for the purposes of the present disclosure, "colloidal dispersion," "chemical formulation" and "dispersion" may be used interchangeably. Colloidal dispersions are understood by those skilled in the art to be a heterogeneous mixture of a dispersed phase particulate in a dispersion medium. That is, a mixture of a continuous liquid medium (e.g. water, acetone, methanol, isopropanol, toluene, xylene) with one or more dispersed particle species (e.g. carbon nanotubes, pigments, abrasives, polymers, proteins). Typically, these particle species are nanoscopic or microscopic sized particulates of gases, liquids or solids; the latter two typically being polymers, proteins or other organic and inorganic molecules. Such dispersions may further comprise additives such as dispersants, binders, surfactants and other organic/inorganic molecules.

In particular, the present disclosure is directed towards colloidal dispersions of nanoscopic structured particles, such as nanotubes, rods, and quantum dots. These nanoscopic particles possess structural characteristics which enable the formation of secondary structures when used to form films and fabrics. For instance, a solution of nanotubes may be deposited to form an unordered nanotube film or fabric. This film may then be rendered into an ordered state, wherein the nanotubes are aligned along their sidewalls and pores are removed from the fabric. In this case, the presence of agglomerates in the nanotube applicator solution may locally prevent the formation of this secondary structure, thereby introducing non-uniformity into the fabric, which may be unacceptable in certain applications.

Such dispersions may be sensitive to the conditions experienced during transport, including temperature changes, vibration, and pressure changes, which produce behavior such as aggregation, clumping, settling, precipitation, flocculation, decomposition, and phase separation, and result in the formation of defects. While these behaviors are typical for colloidal dispersions, the present disclosure is directed towards dispersions which are employed in low tolerance applications, such as CMOS manufacturing, for which normal transport procedures are insufficient to maintain the level of defects below the application requirements. In particular the target application of a uniform dispersion of these structured nanoparticles can be a film or composite where these structured elements assemble to form a regularly structured target material.

For example, casting a dispersion of rod like, carbon nanotubes can result in an open-pore fabric of uniform, regular fabric elements such as pore size and tube dispersion in the solid film. These are very important structures in a number of advanced materials applications, e.g., memory switching layers, photonic films, transparent electrodes etc. Variations in the uniformity of these materials can be attributed to nonuniformities in the dispersions from which they are made, e.g., the clumping, precipitation etc. referred to above and these variations in the target application materials are considered to be defects as they affect performance. Such nonuniformities may be on the scale of nanometers to microns, and the concentration of these defects may be substantially small, far below the scale considered for many common applications. As such, this is a unique problem associated with advanced materials generated from colloidal dispersions of precursors, a focus of the present invention.

The rate of formation and concentration of these defects is strongly affected by the conditions of the suspension, including temperature, solute concentration, the presence of other components, such as but not limited to dispersants or surfactants, as well as input of energy, for instance, by shaking the container or exposure to light of certain wavelengths. In particular, the presence of nucleation sites for defect generation, such as impurities, phase interfaces (such as gas bubbles) and rough surfaces within a container may greatly increase defect formation rate. Without being bound by theory, these factors contribute to defect generation during the transport of chemical formulations.

To address these issues, the generation of defects at phase interfaces, in particular fluid interfaces, may be substantially reduced by removing continuous regions of gas (including headspace—the gas between the surface of the liquid and the top of the container—and bubbles) from a container. To facilitate this, an exemplary storage and delivery system of the present disclosure is provided. As will be discussed in detail below with respect to the figures, the storage and delivery system of the present disclosure allows the removal of the headspace from a container in order to improve the resistance of chemical formulations to defect formation as a result of mechanical shocks and vibration during storage, transport, and delivery. Without being bound by theory, removal of the headspace is expected to reduce the occurrence of defect nucleation sites at liquid-gas interfaces, particularly gas bubbles, which may be exacerbated by such mechanical shocks and vibration.

The present disclosure provides further methods for stabilizing a chemical formulation of nanoscopic elements. In a second method, a chemical formulation is degassed by displacing dissolved chemically reactive gases such as $CO_2$ with an inert gas such as nitrogen or argon. In some applications, the presence of reactive gases such as $CO_2$ may affect the pH or otherwise disrupt the stability of the dispersion of nanoscopic elements, resulting in aggregation and defect formation during transport and storage. Once degassed, the chemical formulation may either be placed into a substantially air-tight container or stored in an environment of inert gases to prevent re-encroachment of the displaced chemically reactive gases. In a third method, a container may be selected and prepared for use with a chemical formulation to substantially eliminate defect nucleation sites such as sharp edges and particle contaminants, and to eliminate materials which may interact with the chemical formulation.

Additionally, in certain aspects of the present disclosure, the storage and delivery system may be usable in a large-scale manufacturing line, such as but not limited to CMOS manufacturing. The present disclosure achieves this by providing a storage and delivery system for use with the storage and delivery methods of the present disclosure which permits the removal of head space within a container while also providing a means to interface with manufacturing equipment and remove a chemical formulation directly from the storage vessel. Further, in certain aspects of the present disclosure, this storage and delivery system provides a filtering mechanism that prevents or removes contamination of the solution with liquids, dirt, dust, or other contaminants during storage, transport, dispensing or filling operations. In certain aspects of the present disclosure, this storage and delivery system also meets the requirements for use in CMOS manufacturing regarding particulate production and cleaning. In certain aspects of the present disclosure, the headspace removal operations and filtering operations are achieved by use of a semi-permeable membrane. The present disclosure also teaches additional methods to reduce defect generation during transport and storage, including stabilizing the pH by preventing the absorption of carbon dioxide, and degassing the chemical formulation prior to placing it in an air-tight container. In these ways, the rate of defect formation within a colloidal dispersion may be substantially reduced during transport and storage, ensuring the dispersion remains in a state suitable for use in applications with strict requirements for defect levels following transport.

Defect Formation During Transport

As mentioned previously, the stability of chemical formulations and the rate of defect generation is highly affected by the conditions of the solution. While stable in certain conditions, changing the temperature or the composition of air in its environment, or applying mechanical or vibrational forces can all de-stabilize a dispersion of nanoscopic elements. During transport in particular, a chemical formulation can be subjected to long periods of vibration, large temperature ranges, and many different atmospheric conditions (for example, air pressure, gas composition, particulates, and humidity). In some cases, this may result in a chemical formulation experiencing an unacceptable degree of defect formation, rendering it unusable by the time it reaches its destination.

Without being bound by theory, when a colloidal dispersion is shipped, it experiences long periods of vibration and mechanical shocks. This prolonged agitation can result in dispersed particles interacting with and contacting a phase interface, such as a gas bubble, where they can become pinned. Once established, these retained particles can then serve as nuclei for defect formation, eventually growing into agglomerates with diameters on the scale of nanometers to microns. When deposited to form a film, these agglomerates can render the film unusable, particularly in cases where a high degree of uniformity is required. Nanotube films, for instance, have extremely low tolerance for such agglomerates as defects can result in non-uniform electrical resistance across a wafer. Thus, any sort of phase interface may provide a site for defect nucleation, including fluid interfaces (such as liquid-gas and liquid-liquid interfaces), and liquid-solid interfaces, and eliminating these interfaces is crucial to ensure the stability of a colloidal dispersion during transport.

Figure 1C:
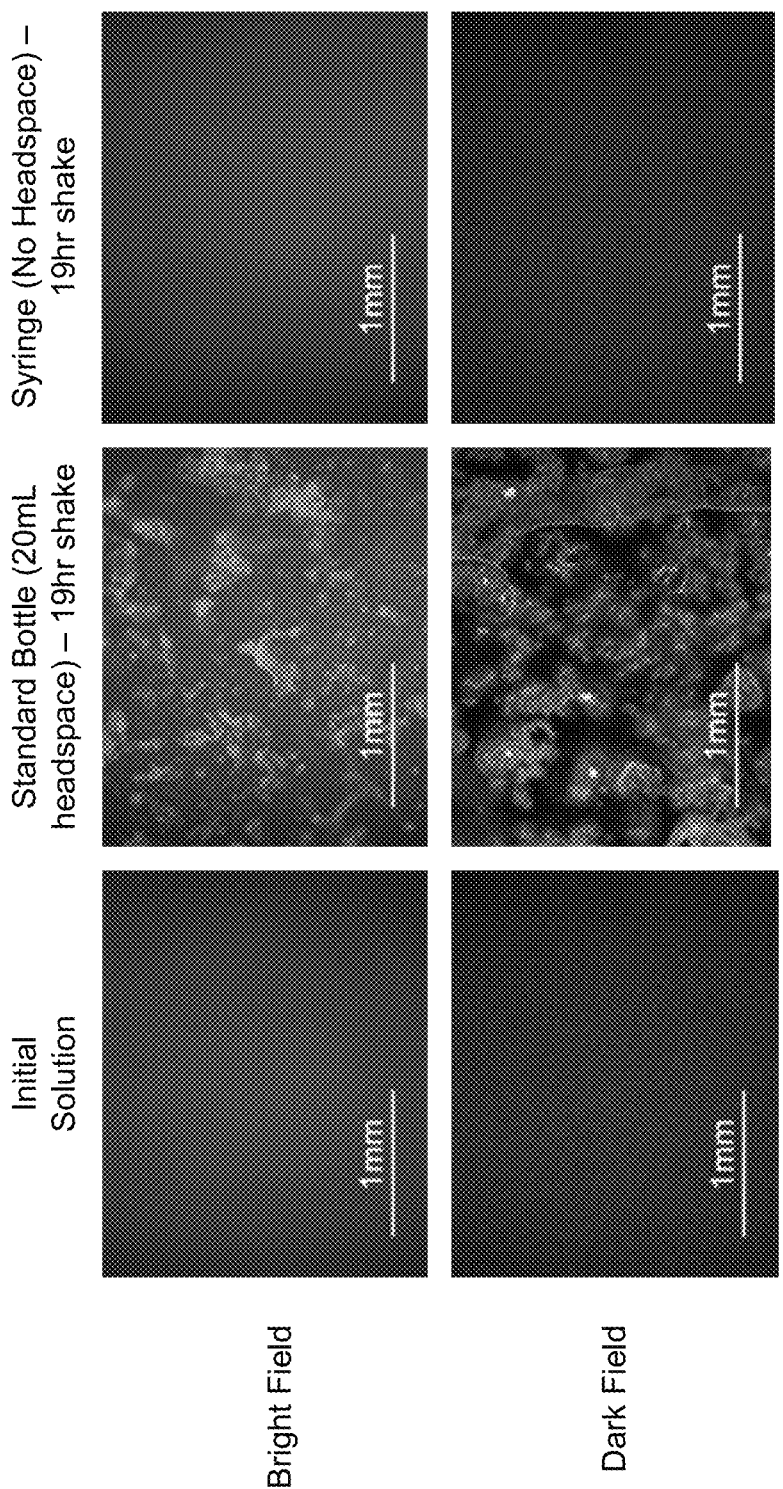
FIG. 1C depicts a cross sectional view of a protective outer cap according to the methods of the present disclosure suitable for use with the bottle closure device of FIG. 1A.

These behaviors were examined in a series of experiments to determine the cause and severity of this agglomeration during transport, the results of which are depicted in FIGS. 1A-1C. FIG. 1A shows the results of a shake stability experiment in graph 1000 designed to simulate the conditions experienced during international shipping. Five containers were filled with a nanotube solution, including three standard bottles and two syringes with varying amounts of headspace (20 mL, 3-5 mL and nearly zero headspace), to conduct the shake test. The samples were subjected to 19 hrs of vibration, then were examined for particles and spin coated to form a fabric.

As can be seen in FIG. 1A, reducing the amount of headspace resulted in significantly lower particle counts in solution following the experiment. This is most clearly seen in the syringe samples, wherein the syringe with headspace showed a particle count of about 1 million, while the syringe with zero headspace had a particle count of about 2000. When used to form a fabric by spin coating the samples onto wafers, the samples with headspace showed significantly increased non-uniformity and defects, as depicted in FIGS. 1B and 1C. FIG. 1B, for instance, compares a wafer formed with the sample containing the highest particle count (the standard bottle with extra headspace) to the wafer formed with the sample containing the lowest particle count (syringe with no headspace). As can be seen, the wafer formed from the solution taken from the standard bottle is highly irregular and unusable to form electronic components. This is again shown in the SEM images of FIG. 1C, which compares wafers formed with the control solution (which did not undergo the shake test) with wafers formed from the solutions containing the highest and lowest particle count. The wafer formed from the solution stored in a standard bottle is clearly unusable, while the fabric formed from the solution stored without headspace shows no significant increase in defects compared to the control.

In this way, the presence of headspace, and, more generally, any phase interfaces, may result in the formation of defects during the transport of chemical formulations of nanoscopic elements, and removing this headspace may significantly enhance the stability of a colloidal dispersion. As mentioned previously, however, other factors may influence or result in this aggregation. For instance, dispersions are typically most stable at a particular pH, as the particles in solution are kept suspended by electrostatic repulsion with neighboring particles and interaction with the solvent. Each particle is coated with a layer of charged particles which inhibit its polarizability, which is the mechanism by which particles tend to aggregate. Carbon nanotubes, for instance, may be functionalized with negatively charged carboxylate groups to make them soluble in water. These groups form an electrostatic barrier that prevents nanotubes from attracting each other. Disrupting this repulsion, for example, by changing the pH or adding salt to the solution, can de-stabilize the dispersion and result in aggregation of the particles.

During transport and storage, the atmospheric composition may affect the stability of a chemical formulation by changing the pH. Carbon dioxide, for instance, forms carbonic acid when mixed with water, acidifying the solution. If the stability of a chemical formulation is dependent on a particular pH, this may result in defect formation. This formation may not require mechanical disturbance such as occurs during transport, simply time and a sufficient concentration of carbon dioxide. However, dispersions that may have drifted in composition to a point of reduced stability might be driven under the mechanical agitation to accelerate the degradation process. Thus, this mode of destabilization may primarily be an issue during long-term storage of a solution, or during long periods of transport.

Storage and Delivery Methods and Systems

As discussed previously, the present disclosure provides several storage and delivery methods that can mitigate the possibility of defect generation during transport. In a first method, the headspace may be removed from a container before transport and storage. This involves filling a container with a chemical formulation, then applying pressure (for instance, by tightening a girdle around the container, or a vacuum pump) to raise the level of the liquid until there is no gas between the liquid and the container. In a second method, the chemical formulation may be degassed before placing it into a container, in which an inert gas is bubbled through the solution to substantially displace dissolved chemically reactive gases such as carbon dioxide. Once degassed, the solution may be placed into either an air-tight container, or stored in an environment substantially free from chemically reactive gases. Finally, in a third method, the chemical formulation may be stored in a container selected and prepared to prevent defect formation. In this method, a container must be free from rough or sharp surfaces, free from particle contamination, and be composed of a material that will not react with or leech into a particular chemical formulation.

To this end, the present disclosure provides a variety of storage and delivery systems which may facilitate the methods taught herein. These storage and delivery systems primarily comprise a bottle closure device which may be capable of performing the required functions of the methods in an efficient manner. It should be noted, however, that these storage and delivery systems are provided only as an example of how the methods may be implemented efficiently and effectively, and any system meeting the requirements herein may be used, depending on the needs of a particular application.

For instance, several commercially available bottle closure devices may be usable with the methods of the present disclosure. FIGS. 2A-2F depict the use of a Triforest Vented Duocap 201 in the methods of the present disclosure to remove the headspace from a container and prepare it for transport. As will be discussed in more detail later, this procedure first comprises filling a desired container 200 with a dispersion, shown in FIG. 2A. Next, the Triforest Vented Duocap 201 is secured to the container, as shown in FIG. 2B. During normal use of such a cap, the container is now sealed and secured, however, according to the methods of the present disclosure, further steps are required to stabilize a colloidal dispersion for transport which are not necessary unless the dispersion is susceptible to shake instability. Thus, in order to secure the container further, a belt 202 is wrapped around the bottle, as depicted in FIG. 2C and tightened until the headspace is evacuated through the semi-permeable membrane, analogous to the steps depicted in FIGS. 4C and 4D. As can be seen in FIG. 2D, this process continues until the air gap above the solution can no longer be seen. At this point, the headspace has been substantially removed, and the bottle is inverted as shown in FIG. 2E to ensure that all the headspace has been removed and the cap does not leak. Finally, the protective cap is secured over the closure device as shown in FIG. 2F to prevent damage to the membrane. In this way, a commercially available vented cap may be used to secure a colloidal dispersion for transport and storage.

That said, however, such a cap may not be ideal for large-scale manufacturing, as it is difficult to incorporate into an automated production line. The following examples depict bottle closures which are ideal for use in such a large-scale manufacturing environment, as will be shown in FIGS. 5A-5D and 6A-6C, and can facilitate the methods of the present disclosure with much greater efficiency. It should be noted, however, that the present disclosure provides methods of maintaining the stability of a colloidal dispersion during transport, and while the bottle closure devices described below may possess significant advantages for such an application, the invention is not limited to these exemplary closure devices disclosed.

Figure 3A:
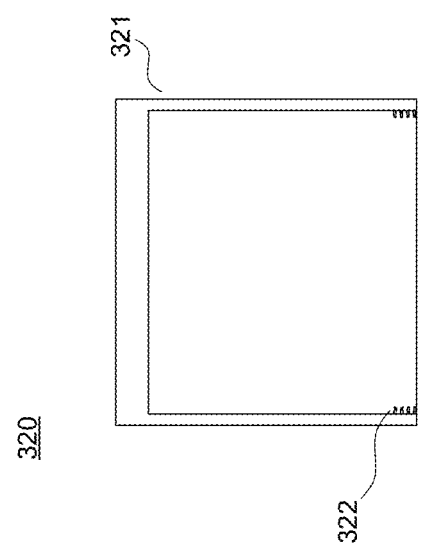
FIG. 3 depicts a cross-sectional view of a fully assembled storage and delivery system according to the method of the present disclosure that includes the bottle closure device of FIG. 1A, the dispenser nozzle cap of FIG. 1B, and the protective outer cap of FIG. 1C.

FIG. 3A depicts a first bottle closure device 300 according to the methods of the present disclosure, comprising main body 301, primary cap attachment 302, dispenser cap attachment 303, fixed dispenser nozzle 304, fixed downtube 305, semi-permeable membrane 306 and vents 307. The main body 301 of the bottle closure device includes attachment mechanism 301a which allows the attachment of bottle closure device 300 to a storage vessel, which may be a variable volume container, as will be shown in FIG. 3. It should be noted, however, that the present disclosure is not limited in the nature of attachment mechanism 301a. Indeed, a number of attachment methods can be used to secure bottle closure device 300 to a storage vessel such as, but not limited to, compression fittings and friction fittings. While threaded attachment methods are shown through the present specification for ease of explanation, essentially any securement means is sufficient for the methods of the present disclosure so long as the attachment method provides a liquid-proof seal between a bottle closure device and a storage vessel. Further, in some aspects of the present disclosure, bottle closure device 300 can integrated with a storage vessel such as to be fixed and not removable. Such a combined system may be useful, for instance, in certain applications where the ability to clean the container or bottle closure device is not necessary, or where the storage and delivery system is designed to be single-use. Within such applications, a reusable securement means such as attachment mechanism 301a is not required.

As will be shown and discussed in detail with respect to FIGS. 4C, 5B, and 6A-6C below, when bottle closure device 300 is secured to a storage vessel, semi-permeable membrane 306 will allow the passage of gas through vents 307 while preventing the escape of a selected chemical formulation within the storage vessel, similarly to the Triforest Vented Duocap depicted in FIG. 2. In some applications, membrane 306 may have mechanical properties and a permeability to certain chemical formulations selected to meet engineering requirements. For example, an aqueous solution may be contained by a hydrophobic membrane, while in other applications a hydrophilic or other selected membrane may be advantageous. While the use of a semi-permeable membrane may be ideal for use with the methods of the present disclosure, other means may be employed to remove the headspace. In such cases, bottle closure device 300 may not include semi-permeable membrane 306. With the inclusion of a semi-permeable membrane, vents 307 permit the addition and removal of gas from the container without removing the closure device, facilitating the removal of head space and emptying of the container (as will be described in more detail below).

Figure 5B:
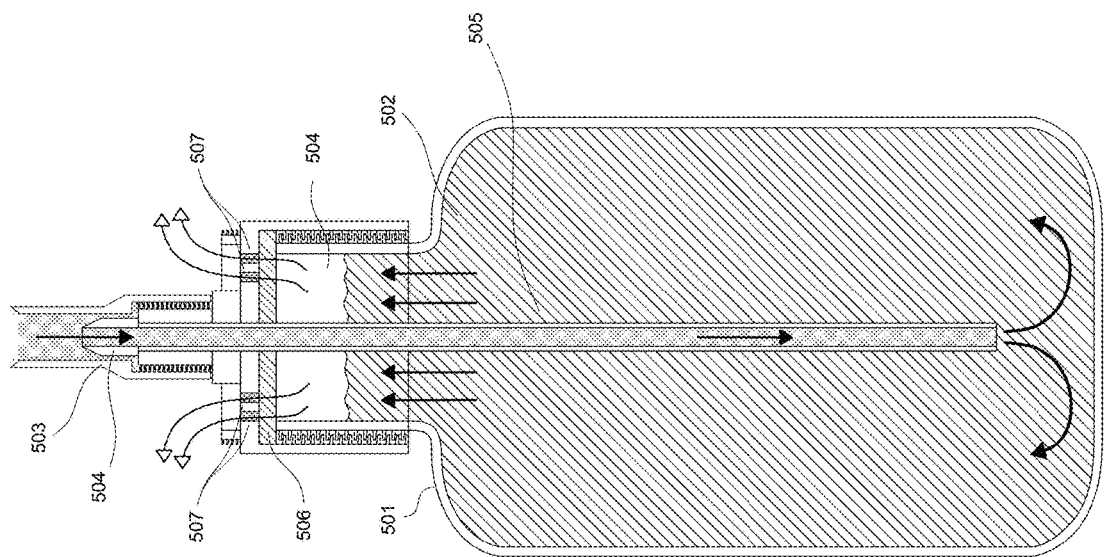
FIG. 5B illustrates the filling of a storage vessel through a fill apparatus secured to a bottle closure device, wherein displaced gas is released through a semipermeable membrane and vents within a second filling method.
Figure 5A:
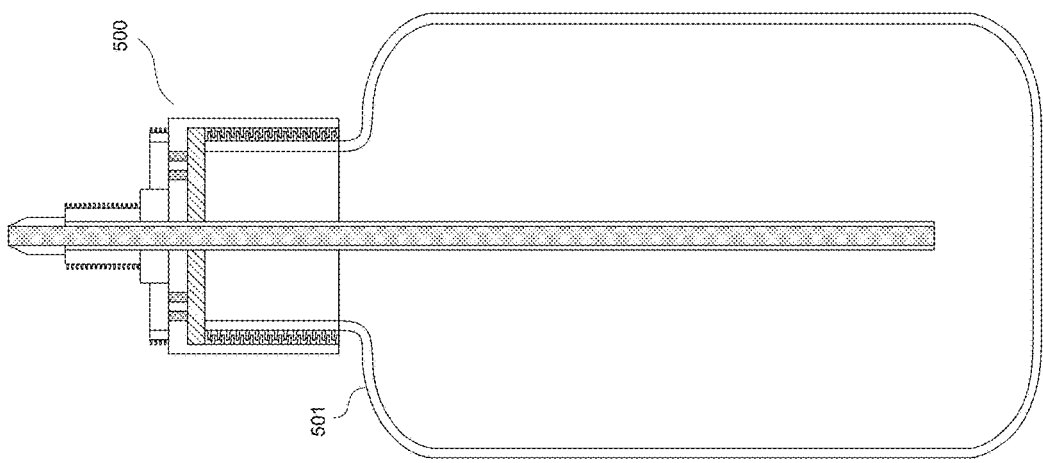
FIG. 5A depicts a bottle closure device secured to an empty storage vessel within a second filling method.
Figure 5D:
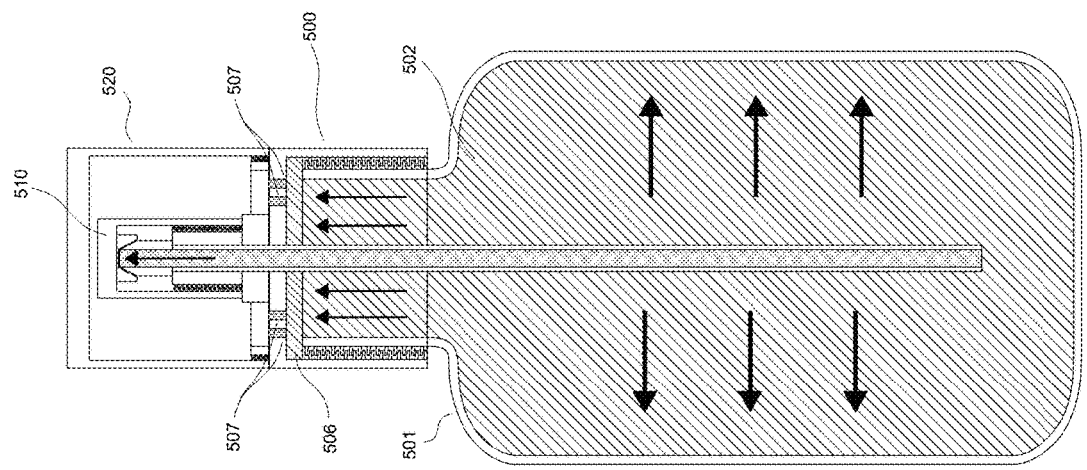
FIG. 5D illustrates the securing of a protective cap to a bottle closure device within a second filling method.
Figure 5C:
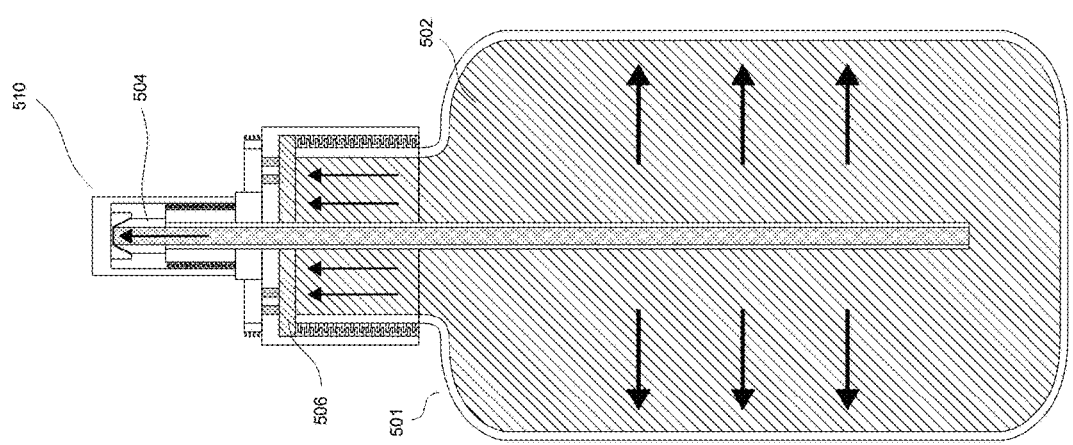
FIG. 5C illustrates the disengagement of a fill apparatus and securement of a dispenser nozzle cap to a bottle closure device secured to a substantially full storage vessel within a second filling method.
Figure 6A:
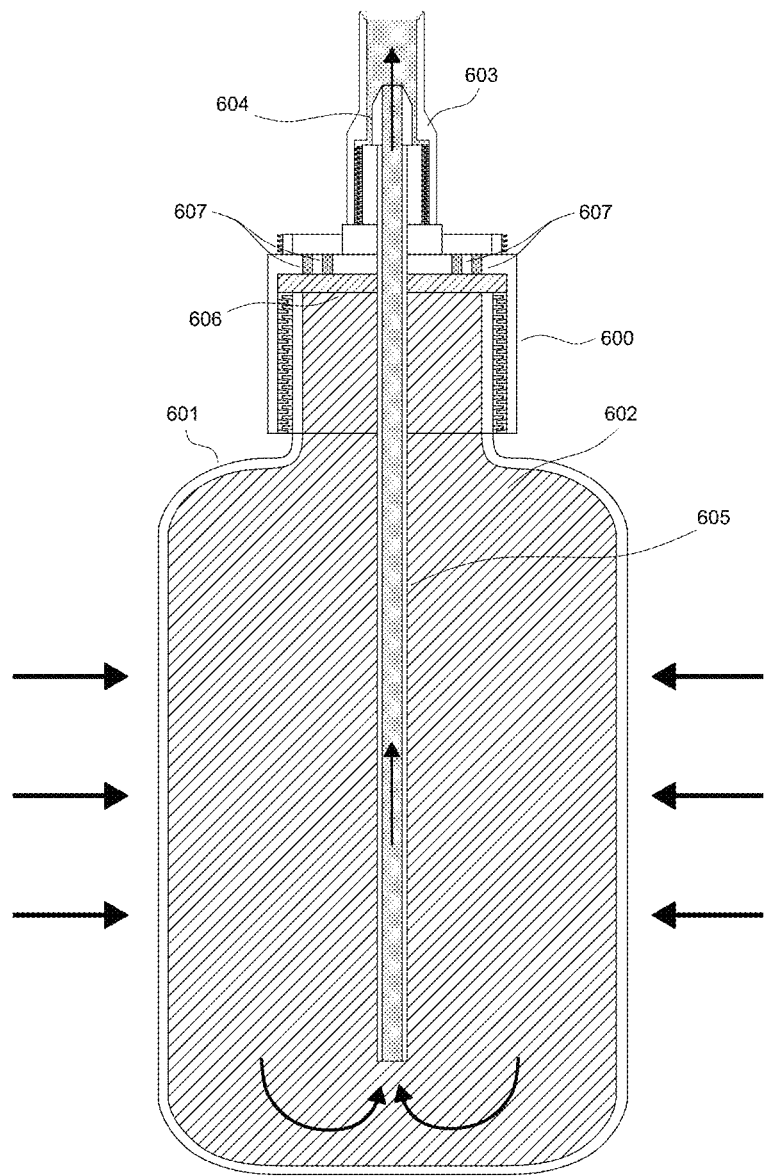
FIG. 6A illustrates a first method for dispensing a chemical formulation from a storage and delivery system according to the methods of the present disclosure that uses external pressure applied to the storage vessel to dispense the formulation through the downtube.
Figure 6B:
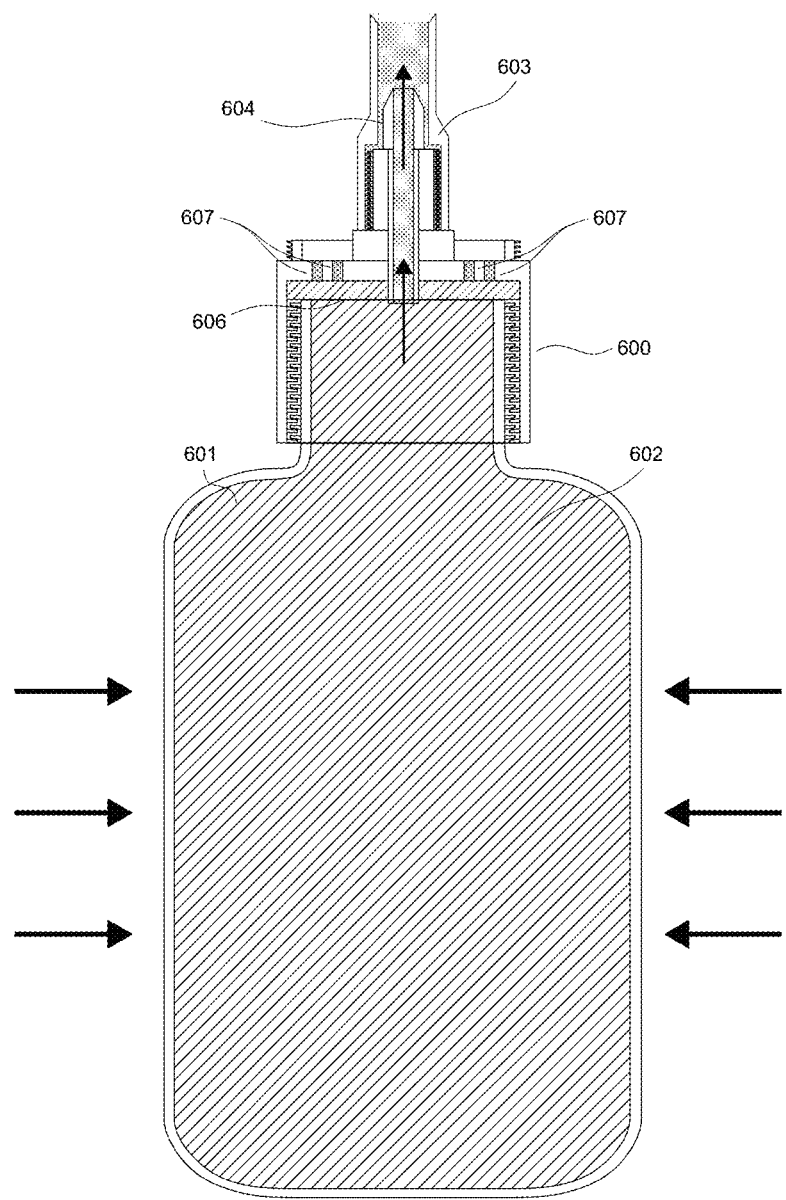
FIG. 6B illustrates a second method for dispensing a chemical formulation from a storage and delivery system according to the methods of the present disclosure that uses external pressure applied to the storage vessel to dispense the formulation directly through the dispenser nozzle.
Figure 6C:
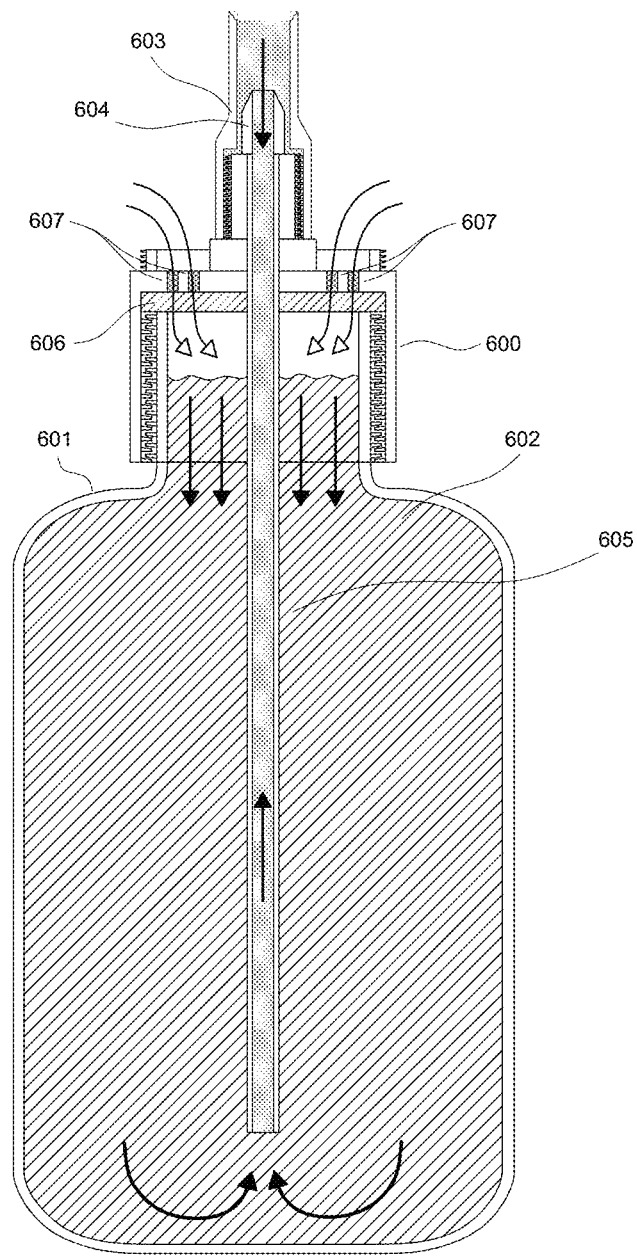
FIG. 6C illustrates a third method for dispensing a chemical formulation from a storage and delivery system according to the methods of the present disclosure that uses external air pressure applied through the semi-permeable membrane.

Finally, within this first bottle closure device 300, fixed downtube 305 extends from the main body of device 300 into an attached storage vessel (not shown in FIG. 3A) to provide a pathway to dispense a stored chemical formulation, as is shown in FIGS. 6A and 6C and discussed in detail below. In certain applications, fixed downtube 305 can also be used to fill an attached storage vessel, as is shown in FIGS. 5A-5C and discussed in detail below. Downtube 105 may be either rigid or flexible and may be of varying shapes and sizes as best befits the needs of a particular application. When used in this way, a filter element may be integrated into fixed downtube 305, as well as all of the exemplary downtubes provided herein, as either an internal component or a removable attachment to remove at least some contaminants from a dispersion during a dispensing operation. This filter element may be designed to remove agglomerates and other particulates such as dirt or dust which may have contaminated the dispersion, or may be designed to remove particular chemicals present in the dispersion.

Also, while this first bottle closure device 300 as shown in FIG. 3A includes fixed downtube 305, the methods of the present disclosure are not limited in this regard. Indeed, FIGS. 7A-7E, FIGS. 8A-8F, and FIGS. 9A-9G (discussed in detail further below) detail storage and delivery systems according to the methods of the present disclosure that include removable downtubes. Further or any other device included in a bottle closure device which is capable of providing access to a liquid contained in a storage vessel and of providing a means to remove it from said storage vessel. As used herein, an access port may refer to, for instance, a dispenser nozzle, downtube attachment, and universal attachment, as will be described later. Additionally, "access port closure mechanism" is used herein to refer to any device capable of preventing the removal of liquid from a storage vessel through the access port. This may refer, for instance, to a dispenser cap and a closure cap, as will be described later, or any other means for sealing an access port to prevent the removal of a contained liquid.

Figure 3B:
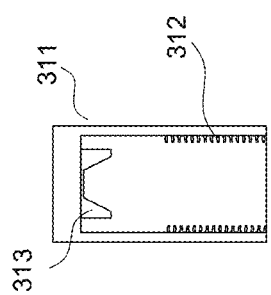
Figure 3C:
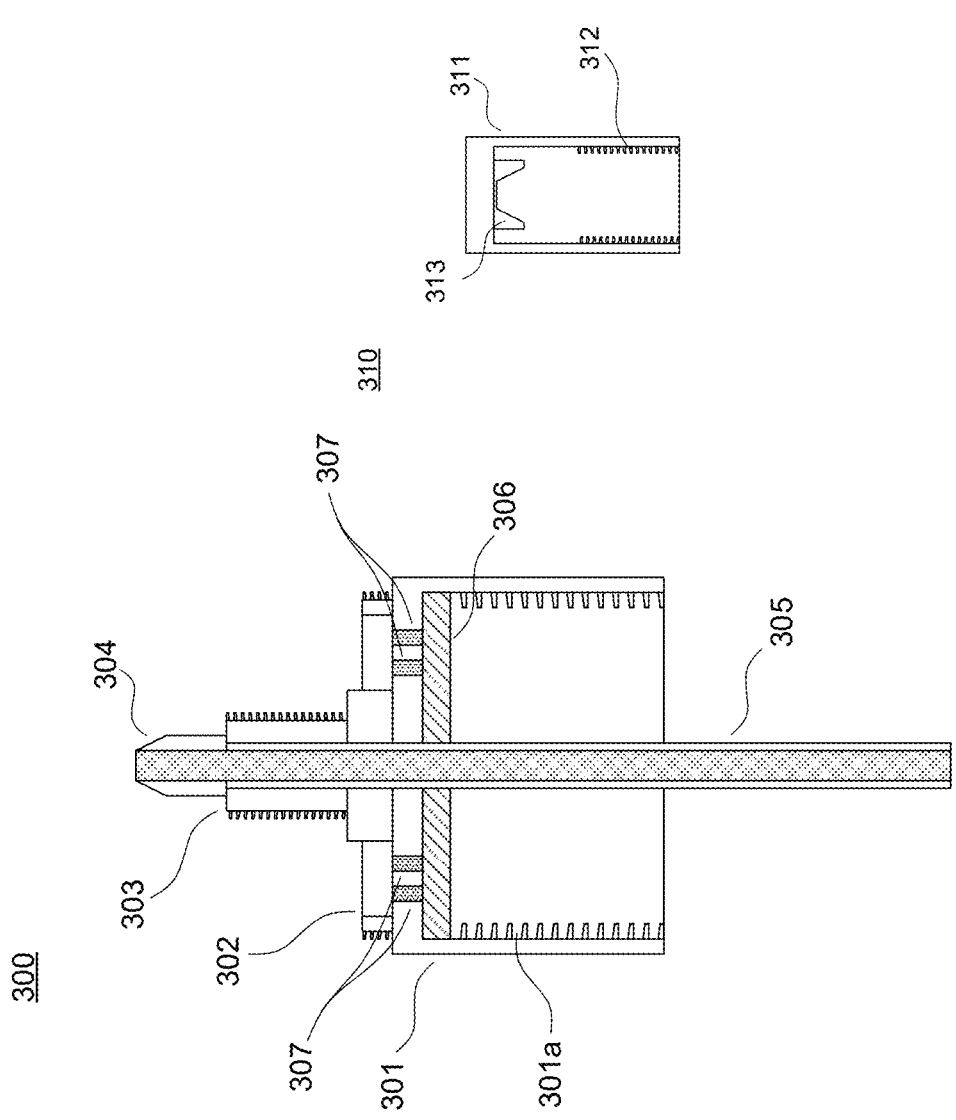

FIG. 3C shows a cross-section of a protective cap 320 suitable for use with first bottle closure device 300 of FIG. 3A. Protective cap 320 is comprised of main body 321 and attachment mechanism 322, which interfaces with primary cap attachment 302 of FIG. 3A. When engaged, protective cap 320 completely contains membrane 306, vents 307 and dispenser cap 310, protecting the closure device from damage and preventing the clogging of vents 307 by dirt and other particles.

As discussed previously with respect to attachment mechanism 301a of FIG. 3A, while both dispenser cap 310 of FIG. 3B and protective cap 320 of FIG. 3C are depicted as being secured to bottle closure device 300 of FIG. 3A via treaded attachments, the present disclosure is not limited in this regard. Indeed, a number of attachment methods can be used to secure these caps to bottle closure device 300 such as, but not limited to, compression fittings and friction fittings. While threaded attachment methods are shown through the present specification for ease of explanation, essentially any securement means is sufficient for the methods of the present disclosure so long as the attachment method provides a liquid-proof seal between these elements.

Figure 3D:
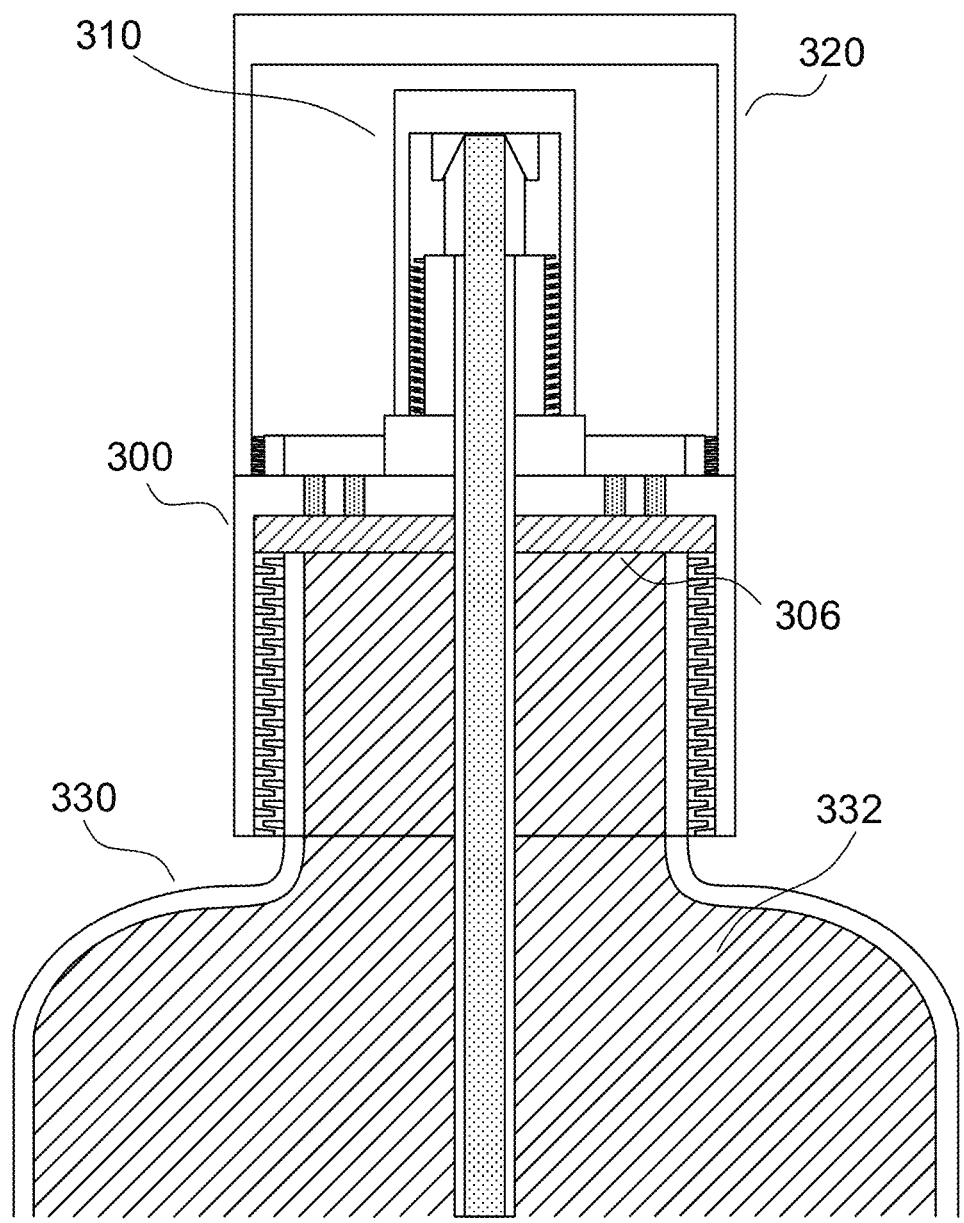

FIG. 3D shows a cross-sectional view of a fully assembled storage and delivery system according to the methods of the present disclosure, comprising bottle closure device 300 (as shown in FIG. 3A), dispenser cap 310 (as shown in FIG. 3B), protective cap 320 (as shown in FIG. 3C), attached to a storage vessel 330. Within the fully assembled storage and delivery system of FIG. 3D, bottle closure device 300 is secured over the opening of storage vessel 330, with dispenser cap 310 and protective cap 320 secured over dispenser nozzle 304 and bottle closure device 300, respectively. The storage and delivery system is shown in a state ready for transport or storage, with storage vessel 330 filled with chemical formulation 332 and substantially devoid of headspace, wherein chemical formulation 332 is in contact with semi-permeable membrane 306. In certain applications, a tamper ring (not shown in FIG. 3D) may be installed over bottle closure device 300 and storage vessel 330 to indicate when bottle closure device 300 has been removed. Such a tamper indicator device may be advantageous, for instance, in high-purity applications where removing bottle closure device 300 may result in unacceptable contamination of the chemical formulation 332.

Figure 3E:
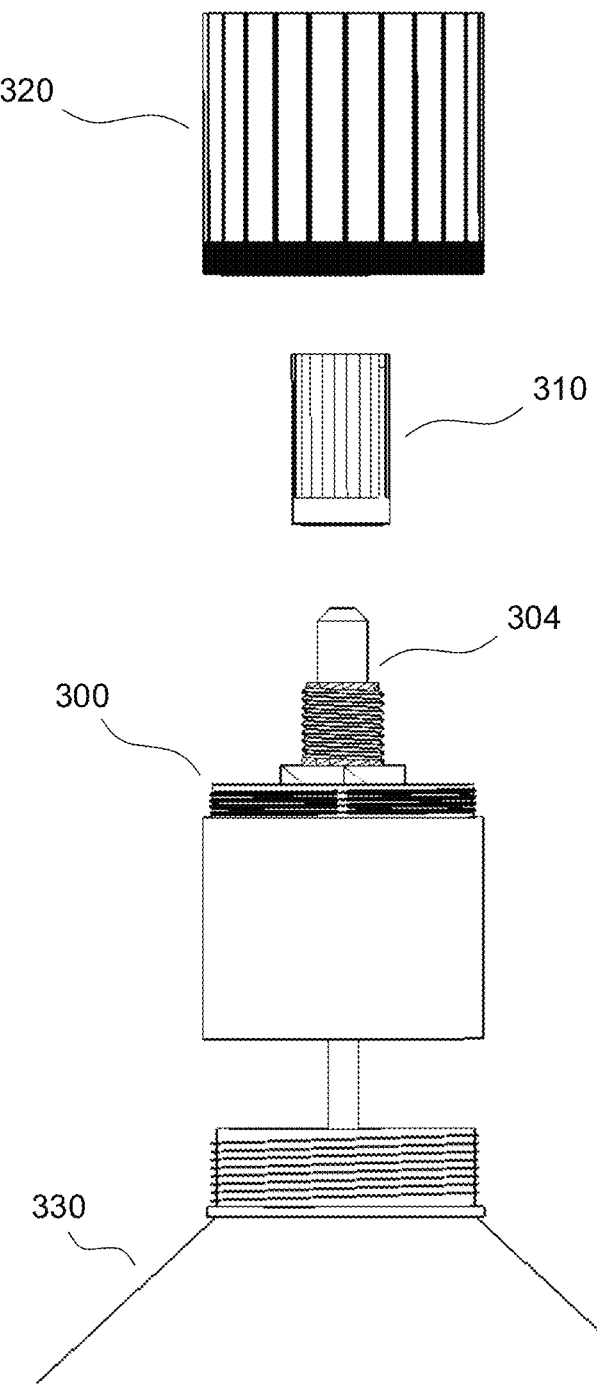

FIG. 3E shows an expanded diagram view of the storage and delivery system of FIGS. 3A-3D according to the methods of the present disclosure, comprising bottle closure device 300 and dispenser nozzle 304 (as shown in FIG. 3A), dispenser cap 310 (as shown in FIG. 3B), protective cap 320 (as shown in FIG. 3C), and storage vessel 330. As described in detail with respect to FIGS. 3A-3D above, bottle closure device 300 is secured over the opening of storage vessel 330, with downtube 305 penetrating into the interior of storage vessel 330. Dispenser cap 310 is secured over dispenser nozzle 304, and protective cap 320 is secured over bottle closure device 300.

Storage vessel 330, depicted in FIGS. 3D and 3E may, in certain applications, be a variable volume container. As used herein, a variable volume container is a device for holding a liquid which may be compressed or expanded (for example, by applying or removing an external pressure) to selectively adjust the volume of the container. According to the methods of the present disclosure, a variable volume container may be flexible or semi-rigid, and may be of any shape or size. Examples of variable volume container include, but are not limited to, a polyethylene bottle and an LDPE bag. In other applications, the storage vessel 330 of FIGS. 3D and 3E may be a rigid container. Examples of a rigid container include, but are not limited to, a polycarbonate bottle, a 55 gal drum, a glass bottle and a liquid storage tank. The rigidity of the storage vessel may affect the filling and emptying operations which may be employed. A variable volume container may be filled or emptied according to any of the methods taught in the present disclosure. A substantially rigid and inflexible container, however, may be filled or emptied according to the methods taught in FIGS. 5A-5D and FIG. 6C.

Figure 4B:
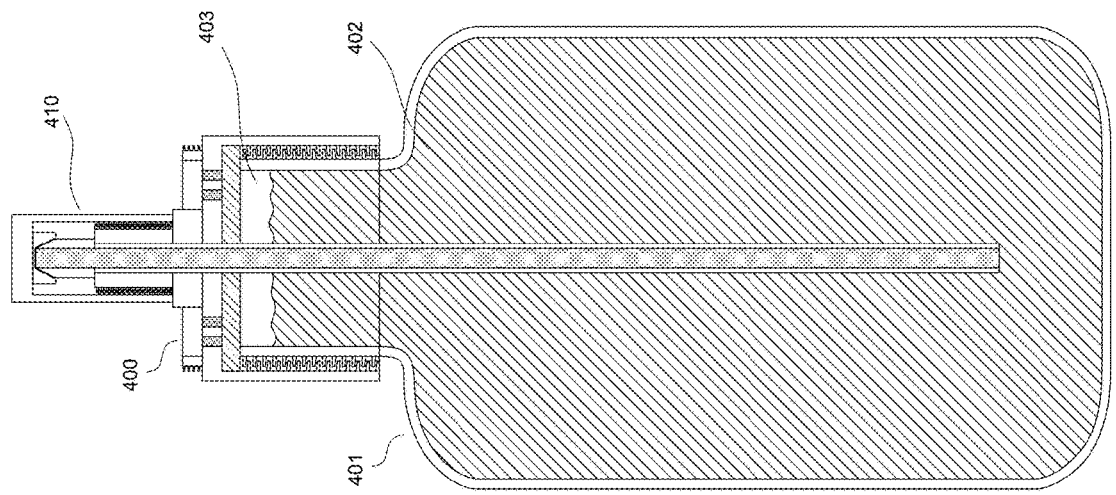
FIG. 4B illustrates the application of a bottle closure device and dispenser cap to a storage vessel filled with a chemical formulation within a first filling method.
Figure 4A:
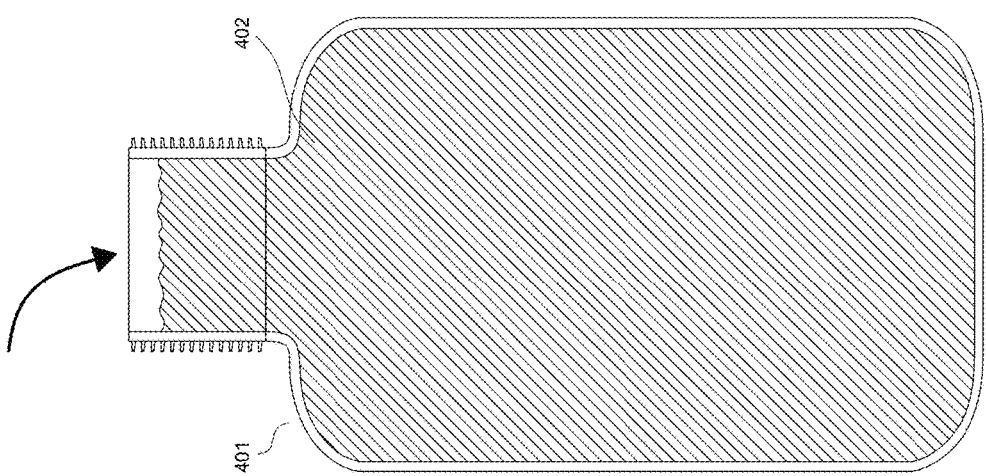
FIG. 4A illustrates the filling of a storage vessel with a chemical formulation within a first filling method.
Figure 4D:
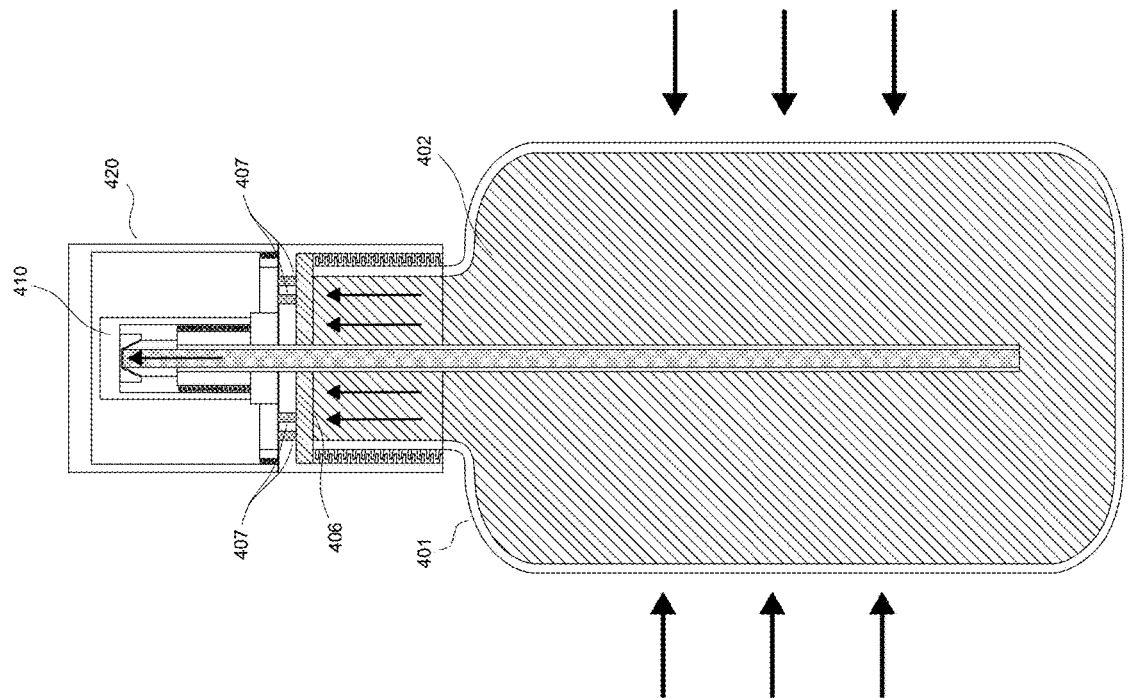
FIG. 4D illustrates the attachment of a protective cap to a storage vessel filled with a chemical formulation devoid of headspace within a first filling method.
Figure 4C:
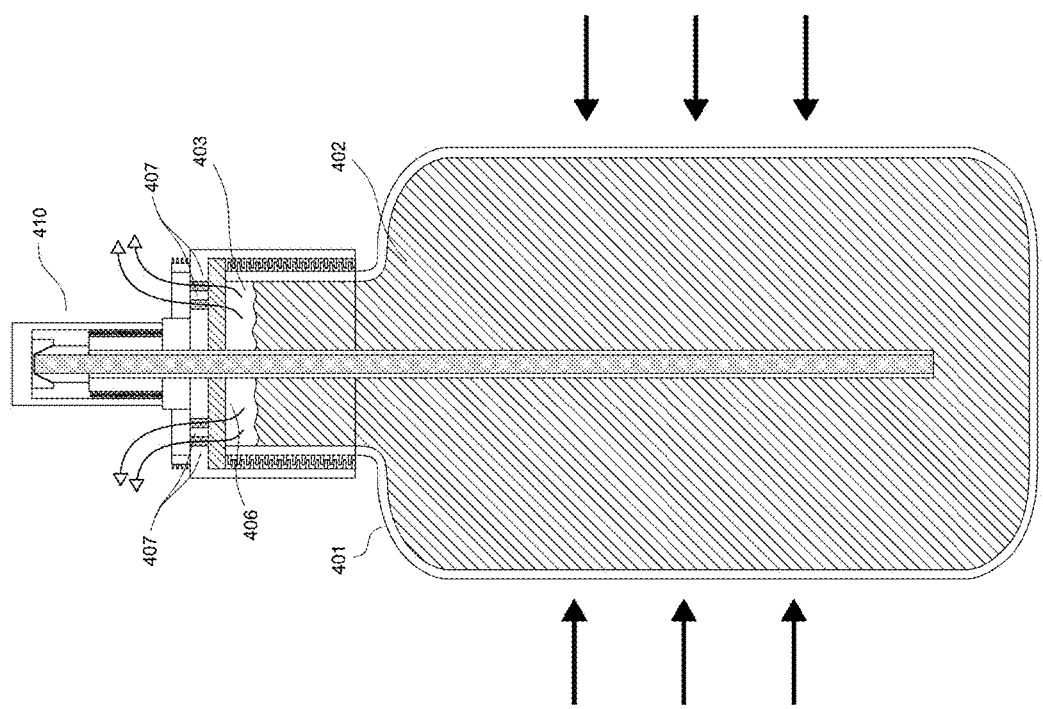
FIG. 4C illustrates the evacuation of headspace through a semipermeable membrane and vents in a storage vessel filled with a chemical formulation within a first filling method.

FIGS. 4A-4D illustrate a first method for filling a storage and delivery system with a chemical formulation and preparing it for transport and storage, according to the methods of present disclosure, suitable for use with a variable volume container. Within this first fill method, a storage vessel 401 is filled with a desired volume of a chemical formulation 402 (FIG. 4A) prior to the application of a bottle closure device 400 and dispenser cap 410 (FIG. 4B). Once bottle closure device 400 is secured over storage vessel 401 with dispenser cap 410 in place, pressure is then applied to storage vessel 401 to reduce its volume, such that substantially all headspace remaining in the storage vessel is evacuated through semi-permeable membrane 406 and vents 407 (FIG. 4C). As discussed previously, membrane 406 permits the evacuation of gas through vents 407 while preventing the release of a chemical formulation. Protective cap 420 is then attached to bottle closure device 400 while pressure is maintained on storage vessel 401, either by maintaining the applied external pressure or by covering vents 407 to prevent gas from reentering storage vessel 401 (FIG. 4D). In this way, a storage and delivery system according to the methods of the present disclosure is loaded with a desired volume of a chemical formulation prior to the application of a bottle closure device and prepared for shipment and storage.

Figure 2A:
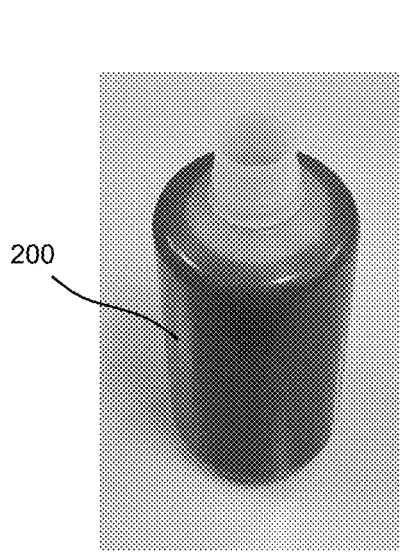
FIG. 2 depicts a blown-out 3D view of a storage and delivery system according to the methods of the present disclosure which includes the bottle closure device of FIG. 1A, the dispenser nozzle cap of FIG. 1B, and the protective outer cap of FIG. 1C.
Figure 2B:
Figure 2C:
Figure 2D:
Figure 2E:
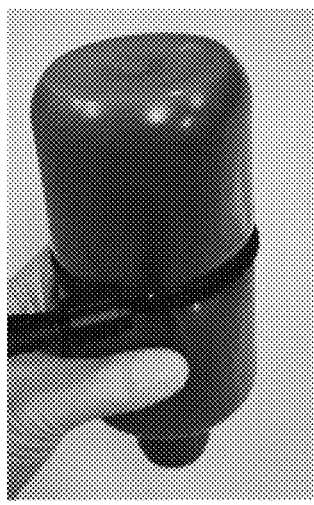
Figure 2F:

Looking now to FIG. 4A, in a first process step storage vessel 401 is filled with a preselected, desired volume of chemical formulation 402, analogous to the step depicted in FIG. 2A. As previously discussed, storage vessel 401 may be a variable volume container, permitting its volume to be reduced by applying external pressure. In a next process step, shown in FIG. 4B, bottle closure device 400 is secured to container 401 along with dispenser cap 410, analogous to the step shown in FIG. 2B. In certain applications, it can be desirable to load storage vessel 401 with chemical formulation 402 in this way (that is, prior to securing bottle closure device 400). FIGS. 5A-5D (discussed in detail further below) illustrate a second fill operation, according to the methods of the present disclosure, wherein a storage vessel is loaded with a preselected volume of a chemical formulation subsequent to the securement of a bottle closure device.

As shown in FIG. 4B, at this point in the fill operation storage vessel 401 contains a preselected volume of chemical formulation 402 as well as headspace 403 (that is, the space between the surface of chemical formulation 402 and the top of storage container 401). As previously discussed, within certain applications, headspace 403 can be detrimental to the stability of a chemical formulation during storage and/or transport. In such applications, for example, vibration or excessive movement of a container including this headspace can result in flocculation, clumping, or material precipitating from solution within a chemical formulation, rendering it unusable without further processing. As such, in a next process step (shown in FIG. 4C) this headspace is removed.

Looking now to FIG. 4C, in this next process step, analogous to that depicted in FIG. 2D, external pressure is applied to container 401 to drive headspace 403 (that is, the gas essentially "trapped" in the top of storage vessel 403) out through semi-permeable membrane 406 and vents 407. This external pressure is increased until the surface of chemical formulation 402 reaches membrane 406 and headspace 403 is substantially completely removed. In certain applications, this pressure deforms the body of the storage vessel (a variable volume container, in such applications, as previously discussed) to reduce its volume, thereby displacing gas within the container. Within some applications, once chemical formulation 402 contacts semi-permeable membrane 406 (that is, once substantially all of headspace 403 has been removed), no further pressure is applied and container 401 remains in a deformed state while chemical formulation 402 exerts essentially no pressure on membrane 406. Within other applications, chemical formulation 402 may exert a pressure on membrane 406 that is less than the breakthrough pressure of the selected membrane-liquid system. This external pressure may be applied to container 401 using a number of methods as best befits the needs of a particular application. For example, the external pressure may be applied by means of mechanical deformation, for instance, by a girdle or belt wrapped around the outside of the container, as depicted in FIG. 2C. In other applications, the pressure may be applied by means of negative air pressure, for instance, by a vacuum pump. In some cases, once headspace 403 has been removed and its removal maintained, the storage and delivery system may be considered to be in a state suitable for transport and storage.

In some applications, a final process step shown in FIG. 4D may be performed to provide additional protection to the storage and delivery system, analogous to the step shown in FIG. 2F. With headspace 403 removed, protective cap 420 is secured to bottle closure device 400 and over membrane 406, vents 407, and dispenser cap 410, while pressure is maintained on container 401 in order to prevent re-encroachment of gas through vents 407. In certain applications, this pressure is maintained on storage vessel 401 by keeping it in a deformed state to ensure chemical formulation 402 remains in contact with membrane 406 (for example, by sustaining the mechanical force applied to the storage vessel with a pressure band or girdle). In other applications, this pressure can be maintained via an air-tight seal applied over vents 407, providing a pressure equilibrium below the ambient pressure. In such applications, pressure is applied by the outside atmosphere to maintain the deformation of storage vessel 401. This air tight seal can be integrated into protective cap 420 or, alternatively, applied to vents 407 prior to the securement of protective cap 420. In this way, the storage and delivery system of the present disclosure is filled with a preselected, desired volume of a chemical formulation and prepared for transport and storage.

FIGS. 5A-5D illustrate a second method for filling a storage and delivery system with a chemical formulation and preparing it for transport and storage, according to the methods of the present disclosure, which is suitable for use with either a variable volume or rigid container. Within this second fill method, a chemical formulation 502 is loaded into storage vessel 501 directly through bottle closure device 500. That is, storage vessel 501 is filled subsequent to the securement of bottle closure device 500, with chemical formulation 502 being supplied through dispenser nozzle 504 and downtube 505. It will be apparent that the preparation technique depicted in FIGS. 2A-2F using a simple vented cap is incompatible with this filling method due to the lack of a dispenser nozzle. Within this second method, semi-permeable membrane 506 and vents 507 permit gas within storage vessel 501 to be displaced by the added chemical formulation 502 until the chemical formulation 502 substantially fills storage vessel 501, leaving essentially no headspace. In this second filling method, the headspace is removed without requiring deformation of attached storage vessel 501, unlike the methods discussed previously in FIGS. 4A-4D. Alternatively, a selected amount of chemical formulation 502 may be loaded into storage vessel 501, which may be insufficient to substantially eliminate the headspace. In this case, if storage vessel 501 is a variable volume container, the method of headspace removal taught in FIG. 4C may be employed to substantially remove the remaining headspace. In this way, a storage and delivery system according to the methods of the present disclosure is loaded with a volume of a chemical formulation subsequent to the application of a bottle closure device and prepared for shipment and storage.

Looking now to FIG. 5A, in a first process step bottle closure device 500 has been secured to substantially empty storage vessel 501. As previously discussed, storage vessel 501 may be a variable volume container, permitting its volume to be expanded or reduced responsive to applied pressure, or a rigid container. In a next process step, shown in FIG. 5B, fill apparatus 503 is secured over dispenser nozzle 504. According to the methods of the present disclosure, fill apparatus 503 is intended to represent any apparatus suitable for flowing a chemical formulation into storage vessel 501, such as, but not limited to, a hose, pipe or valve system. Within the exemplary fill operation detailed in FIGS. 5A-5D, fill apparatus 503 supplies chemical formulation 502 to storage container 501 through dispenser nozzle 504. As shown in FIG. 5B, as chemical formulation 502 is flowed into storage container 501, displaced gas is released through semi-permeable membrane 506 and vents 507. The fill operation is continued until chemical formulation 502 reaches membrane 506 and headspace 504 is substantially completely removed. In certain applications, chemical formulation 502 may exert essentially no pressure on membrane 506. In other applications, chemical formulation 502 may exert a pressure less than the breakthrough pressure of the membrane-liquid system.

In a next process step, shown in FIG. 5C, with storage vessel 501 substantially completely filled, fill apparatus 503 is disengaged and replaced with dispenser nozzle cap 510. As discussed with respect to FIG. 3B above, dispenser nozzle cap 510 provides a liquid seal with dispenser nozzle 504, preventing the release of chemical formulation 502. As shown in FIG. 5C, at this point in the fill process storage vessel 501 remains substantially completely filled and essentially devoid of any headspace while chemical formulation 502 exerts essentially no pressure on membrane 506, or exerts a pressure less than the breakthrough pressure of the membrane-liquid system. In some aspects of the present disclosure, within this state (that is, as depicted in FIG. 5C) the storage and delivery system of the present disclosure can be considered ready for transport, usage and storage. However, in other aspects of the present disclosure, a selected volume of chemical formulation 502 is loaded into storage vessel 501 which is insufficient to substantially completely remove the headspace. In this case, if storage vessel 501 is a variable volume container, an additional headspace removal operation depicted in FIG. 4C may be required to remove the headspace.

Once the headspace has been substantially completely removed, the storage and delivery system may be considered ready for transport and storage. In other aspects of the present disclosure, however, a final process step shown in FIG. 5D may be employed to secure protective cap 520 over bottle closure device 500 and dispenser nozzle cap 510. Within these applications, protective cap 520 can be used to prevent damage to the bottle closure device 500, dispenser nozzle 504 and membrane 506. Protective cap 520 may also prevent clogging or contamination of membrane 506 and vents 507 by dirt, dust, liquids and other contaminants present in the manufacturing environment or during transport and storage. In this way, the storage and delivery system of the present disclosure is substantially completely filled with a volume of a chemical formulation and prepared for transport and storage.

FIGS. 6A-6C depict methods of emptying a container filled with a liquid chemical formulation according to the methods of the present disclosure, for instance, as part of a manufacturing process. As with the filling methods discussed in FIGS. 5A-5D, these emptying methods are permitted by the presence of a dispenser nozzle and are incompatible with a simple vented cap, as depicted in FIGS. 2A-2F. First, a storage and delivery system is provided in a state suitable for transport and storage, such as is depicted in FIGS. 3D, 4D and 5D. A storage element 601, which may be rigid or a variable volume container, has been filled with a selected amount of chemical formulation 602, such as a carbon nanotube solution, and has been sealed with a bottle closure device 600 according to, for instance, the methods depicted in FIGS. 4A-4D or FIGS. 5A-5D. The dispenser cap has been removed and the dispenser nozzle 604 has been attached to supply apparatus 603, such as, but not limited to, a hose, pipe or valve system, which provides a means to carry a chemical formulation from a storage and delivery system to the point of use. Once engaged to supply apparatus 603, the methods depicted in FIGS. 6A-6C provide exemplary methods for the removal of chemical formulation 602 through dispenser nozzle 604.

FIG. 6A shows a first method of emptying container 601 of chemical formulation 602 through downtube 605 and dispenser nozzle 604, suitable for use with a variable volume container. First, a storage and delivery system is provided in the state depicted in FIGS. 3D, 4D and 5D, wherein a bottle closure device 600 is attached to container 601 substantially completely filled with chemical formulation 602 substantially without headspace. In a first operation, the protective cap and/or dispenser nozzle cap is removed, allowing access to dispenser nozzle 604. In a second operation, supply apparatus 603 is attached to dispenser nozzle 604. Supply apparatus 603 is intended to represent any apparatus suitable to provide a means to remove a chemical formulation from container 601, such as, but not limited to, a hose, pipe or valve system. In a third operation, external pressure is applied to container 601. In certain applications, this pressure may be provided by mechanical forces applied to container 601, for instance, by tightening a girdle or manual compression. In this operation, chemical formulation 602 is forced through downtube 605 and into supply apparatus 603, which carries the chemical formulation to the point of use. This point of use may be, for example, a spin-coating dispenser, a reactor, another container, or a material substrate.

FIG. 6B shows a second method for removing chemical formulation 602, according to the methods of the present disclosure, where a pressure is again applied to the exterior of container 601 in a manner suitable for use with either a variable volume or rigid container. In this case, the downtube 605 present in FIG. 6A has been removed. Beginning with a storage and delivery system in a state ready for transport and storage depicted in FIGS. 3D, 4D and 5D, the protective cap and/or dispenser nozzle cap is removed in a first operation. In a second operation, supply apparatus 603 is attached to dispenser nozzle 604. In certain applications, this operation is not required, and the chemical formulation 602 may be released directly through dispenser nozzle 604. In a third operation, a pressure is applied to chemical formulation 602. Similar to the method taught in FIG. 6A, this pressure may be applied by a mechanical compression of a variable volume container. In some applications, however, this pressure may be the result of, for instance, an air pressure differential or gravity. Membrane 606 prevents the release of chemical formulation 602 through vents 607, while the applied pressure forces chemical formulation 602 through dispenser nozzle 604 and to the point of use. The removal of the downtube may allow substantially complete emptying of chemical formulation 602 in certain applications, such as when container 601 is oriented upside down, which may not be possible with a downtube present. In some cases, storage vessel 601 may be a bag or similarly easily deformable container to allow the extensive deformation necessary to substantially completely remove chemical formulation 602. Storage vessel 601 may also be oriented with dispenser nozzle 604 pointed down, permitting removal of chemical formulation 602 by gravity, which may be aided by a mechanical pressure applied to storage vessel 601. A purely gravity-driven system may be suitable for use with either a variable volume or rigid container if a ventilation method is provided at the base of the container, while the application of a mechanical force necessitates the use of a variable volume container. The methods of FIG. 6B may be advantageous for manual usage to dispense chemical formulation 602 directly from dispenser nozzle 604, similar to a squeeze-bottle.

FIG. 6C shows a third method for the emptying of storage vessel 601, according to the methods of the present disclosure, which uses a positive air pressure to remove apply force to a contained chemical formulation and is suitable for use with either a variable volume or rigid container. Beginning with a storage and delivery system in a state ready for transport and storage depicted in FIGS. 3D, 4D and 5D, the protective cap and/or dispenser nozzle cap is removed in a first operation to allow access to dispenser nozzle 604. In a second operation, supply apparatus 603 is attached to dispenser nozzle 604. A pressure differential is applied between the air and the down-stream apparatus 603 in a third operation, providing a pressure to force chemical formulation 602 through dispenser nozzle 604 and to the point of use. This pressure may be provided by, for instance, a pressure pot. Vents 607 and membrane 606 permit the passage of gas into the container to displace the liquid. As chemical formulation 602 is displaced, the liquid level lowers until the bottom of downtube 605 is reached. At this point, in some circumstances, no further liquid may be removed, as gas begins to flow into downtube 605. When emptied in this way, the gas introduced through vents 607 is filtered by membrane 606, and may be substantially free of certain contaminants, such as but not limited to particulates and water vapor. In this way, chemical formulation 602 is removed from storage vessel 601 without compromising the purity of the solution. Additionally, since the method described in FIG. 6C does not require deformation of the storage vessel, it may be suitable for use with either a variable volume or rigid container.

While the operations described in FIGS. 6A-6C refer to the complete emptying of container 601 for ease of explanation, in certain applications a partial emptying may be required. In these applications, the dispensing methods of FIGS. 6A-6C may be employed multiple times to remove a selected amount of chemical formulation 602. Between these operations, container 601 may be kept substantially free of headspace by maintaining or providing an external pressure, ensuring chemical formulation 602 remains in contact with membrane 606, through the headspace removal operation depicted in FIGS. 4C and 4D. Once the headspace has been substantially removed, the storage and delivery system may be in a state suitable for transport and storage, permitting an arbitrary period of time to elapse between dispensing operations without compromising the purity or integrity of chemical formulation 602. In other applications, gas may be allowed to flow back into container 601 through membrane 606 in situations where headspace is only an issue during transport. In these cases, the gas flowing into container 601 through membrane 606 may be filtered of contaminants. In this way, the purity of chemical formulation 602 may be maintained across multiple dispensing operations.

In some applications it may be desirable to allow customized downtube and dispenser fittings in order to interface with a variety of equipment. There are a wide range of industrial fittings and standards, and a single dispenser nozzle and downtube architecture could not accommodate all or even a majority of these. Additionally, many manufacturers have custom or preferred equipment for use in production lines and would rather use this equipment, such as a custom downtube, than adopt a new standard. Allowing the downtube and dispenser nozzle to be removable without sacrificing the operational characteristics of the bottle closure device would thus provide a significant advantage.

FIGS. 7A-7E demonstrate a first storage and delivery system which permits the use of a removable downtube. The storage and delivery system of FIGS. 7A-7E comprises a bottle closure device 700, a removable downtube 710 and closure cap 720, in addition to, optionally, a dispenser cap and protective cap similar to those depicted in FIGS. 3B and 3C, which are not shown. As will be discussed later with reference to FIGS. 7D and 7E, the storage and delivery system shown in FIGS. 7A-7E is fully compatible with the filling and emptying operations described previously in FIGS. 4A-4D, 5A-5D, and 6A-6C. In some circumstances, the ability to replace and customize the downtube may allow interfacing of the storage and delivery system with a broader range of manufacturing equipment, and may permit usage in a broader range of applications.

FIG. 7A depicts bottle closure device 700, comprising a primary cap ring 701, universal attachment 702, semi-permeable membrane 703 and vents 704. Unlike the storage and delivery system depicted in FIGS. 3A-3C, the dispenser cap attachment 303, dispenser nozzle 304 and downtube 305 shown in FIG. 3A have been replaced with a universal attachment 702 and an access port 705 through bottle closure device 700, which can accommodate a variety of fittings, such as but not limited to a multitude of downtube and dispenser nozzle types and sizes and a closure cap. In certain applications, this may permit usage of the storage and delivery system in manufacturing processes without the adoption of a new interface standard. As stated previously, while the use of a semi-permeable membrane may be ideal to facilitate the methods of the present disclosure, other means may be employed to permit the removal of headspace. In such cases, bottle closure device 700, as well as the other bottle closure examples provided herein, may not include a semi-permeable membrane.

FIG. 7B shows an exemplary removable downtube 710. For ease of explanation, the internal attachment mechanism of removable downtube 710 is depicted as a threaded attachment, however, the present disclosure is not limited in this regard. Indeed, any suitable internal attachment mechanism may be used to provide a liquid seal between downtube 710 and bottle closure device 700. Removable downtube 710 comprises main body 711, downtube 712, dispenser nozzle 713, bottle closure device attachment 714 and dispenser cap attachment 715. Downtube 712 may have any size or shape as required for a specific application and may be either rigid or flexible. Similarly, dispenser nozzle 713 may have any size or shape required for a specific application. The bottle closure attachment 714 interfaces with universal attachment 702, forming a liquid seal with bottle closure device 700 and completely covering access port 705 to prevent the escape of a contained chemical formulation, unless, of course, dispensed or filled through dispenser nozzle 713 according to the methods taught in FIGS. 6A-6C. Dispenser cap attachment 715 interfaces with a dispenser cap, such as the dispenser cap shown in FIG. 3B to prevent the release of a contained chemical formulation. In some applications, however, wherein a dispenser cap is not required, dispenser cap attachment 715 may not be necessary and may be removed.

FIG. 7C shows an exemplary closure cap 720 designed for use with bottle closure device 700 and exemplary downtube 710. Closure cap 720 consists of closure device attachment 721 and closure knob 722. When secured to bottle closure device 700, closure device attachment 721 interfaces with universal attachment 702 and provides a liquid seal for use during transport and storage, completely filling access port 705 to prevent the release of a chemical formulation from an attached container. The smaller form factor of closure device 720 may also reduce incidents of damage compared to the bottle closure device shown in FIG. 3A. Once the storage and delivery system has reached the point of use, closure cap 720 may be removed and replaced with removable downtube 710, allowing the storage and delivery system to interface with a fill or supply apparatus and a chemical formulation to be added or removed from an attached storage vessel according to the methods taught with reference to FIGS. 4A-4D, 5A-5D and 6A-6C above.

FIG. 7D demonstrates the bottle closure device 700 configured for point of use operation. The removable downtube 710 has been attached to the bottle closure device 700 using universal attachment 702. Semi-permeable membrane 703 and vents 704 remain unobstructed, permitting the filling and dispensing operations using the same methods discussed previously in FIGS. 4A-4D, 5A-5D and 6A-B. Although not shown in this figure, a dispenser cap and protective cap (as shown in FIGS. 3B and 3C, respectively) may be attached to the removable downtube and bottle closure device, respectively, but the present disclosure is not limited in this regard. This bottle closure device may not be ideal for high purity applications, such as CMOS manufacturing, as the internal attachment mechanism in universal attachment 702 can produce particle contaminants during the securement or removal of the removable downtube 710 and closure cap 720. In other applications, however, which are not as sensitive to the presence of foreign particles, this contamination may be acceptable.

FIG. 7E depicts bottle closure device 700 configured for transport and storage. Universal attachment 702 has been interfaced with closure cap 720, providing a liquid seal. In this state, the operation shown in FIG. 4C may be used to remove the head space from an attached container partially filled with a chemical formulation to prepare it for transport and storage. Although not shown in this figure, a protective cap (as shown in FIG. 3C) may be attached to bottle closure device 700, but the present disclosure is not limited in this regard. As mentioned previously, the internal threading shown to secure fittings, such as closure cap 720 and removable downtube 710, to universal attachment 702 may produce particle contaminants when these fittings are removed or secured. In some applications this contamination may be acceptable, but may preclude usage in other, high-purity applications such as CMOS manufacturing.

FIGS. 8A-8F provide a second storage and delivery system with a removable downtube, according to the methods of the present disclosure. The storage and delivery system of FIGS. 8A-8F comprises bottle closure device 800, closure cap 810 and removable downtube 820, in addition to, optionally, a dispenser cap and a protective cap similar to those of FIGS. 3B and 3C, respectively, which are not shown. Additionally, the internal threaded attachment depicted in FIGS. 7A-7E has been replaced with a smooth bore. This may reduce the production of particle contaminants, and may be suited to applications where fittings must be regularly removed and secured. As will be discussed later with reference to FIGS. 8E and 8F, the storage and delivery system shown in FIGS. 8A-8F is fully compatible with the filling and emptying operations described previously in FIGS. 4A-4D, 5A-5D, and 6A-6C.

FIG. 8A depicts bottle closure device 800, comprising a primary cap ring 801, universal attachment 802, semi-permeable membrane 803 and vents 804. Unlike the configuration illustrated in FIG. 3A, in this case the dispenser cap attachment 303, dispenser nozzle 304 and downtube 305 have been replaced with a universal attachment 802 and access port 805 through the device which can accommodate a variety of fittings, such as but not limited to a multitude of downtube and dispenser nozzle types and sizes and a closure cap. While FIG. 7A showed an internal threaded attachment within universal attachment 702, universal attachment 802 contains a smooth bore to reduce particle generation. In certain applications, however, universal attachment 802 may have a patterned or textured bore to improve the liquid seal.

FIG. 8B shows an exemplary closure cap 810 designed for use with bottle closure device 800. Rather than attach to universal attachment 802 by a threaded attachment method, closure cap 810 comprises a main body 811 and one or several sealant rings 812. Sealant rings 812 may be rigid or flexible in order to obtain a liquid seal, and may be composed of materials selected to repel a certain chemical formulation and achieve certain mechanical properties. For example, to repel an aqueous chemical formulation, rings 812 may be composed of a hydrophobic material such as PTFE or PFA, a support material coated with a hydrophobic sealant, or a wax plug. Closure cap 810 may be removed or secured to bottle closure device 800 by pulling or pushing the cap from access port 805, respectively. The reduced friction compared to a screw-on method may result in lower particle generation during the attachment and removal operations, depending on the materials selected for sealant rings 812 and universal attachment 802.

Figure 8D:
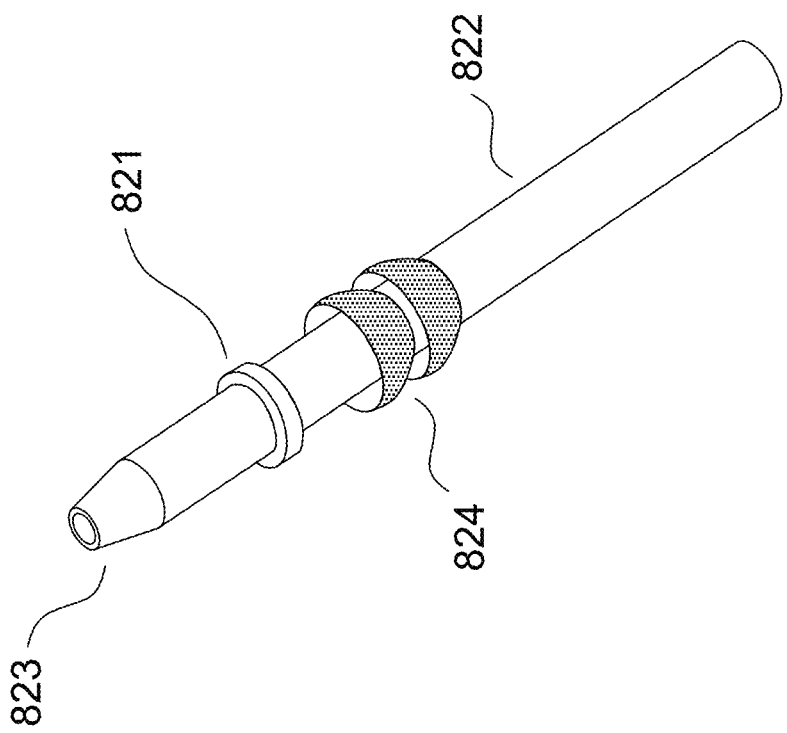
FIG. 8D is a 3D view of the removable downtube of FIG. 8C.
Figure 8C:
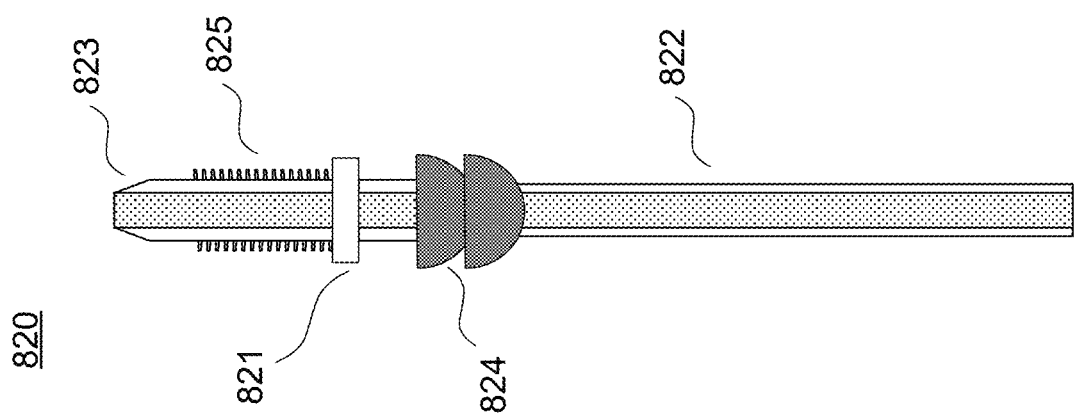
FIG. 8C illustrates a removable downtube comprising a main body, downtube, dispenser cap attachment and one or several sealant rings.

FIG. 8C depicts a removable downtube 820 designed to interface with universal attachment 802 of FIG. 8A. Removable downtube 820 comprises a main body 821, downtube 822, dispenser nozzle 823, one or several sealant rings 824 and dispenser cap attachment 825. Downtube 822 may be of any size or shape and may be either rigid or flexible, as required for a specific application. Similarly, dispenser nozzle 823 may have any size or shape, as required for a specific application. Unlike removable downtube 710 depicted in FIG. 7B, removable downtube 820 is attached using one or several sealant rings. Sealant rings 824 may be rigid or flexible in order to obtain a liquid seal, and may be composed of materials selected to repel a certain chemical formulation and achieve certain mechanical properties. For example, to repel an aqueous chemical formulation, rings 824 may be composed of a hydrophobic material such as PTFE or PFA, a support material coated with a hydrophobic sealant, or a rubber ring. Downtube 820 may be removed or secured to bottle closure device 800 by pulling or pushing the downtube from access port 805. The reduced friction compared to a threaded attachment method may result in lower particle generation during the attachment and removal operations, depending on the materials selected for sealant rings 824 and universal attachment 802.

FIG. 8D shows a 3D view of the removable downtube, depicting the main body 821, downtube 822, dispenser nozzle 823, and one or several sealant rings 824. Here it may be clearly seen that sealant rings 824 fully encompass downtube 822, however, the design of the sealant rings is exemplary and may be any size or shape required to provide a liquid seal with access port 805.

Figure 8F:
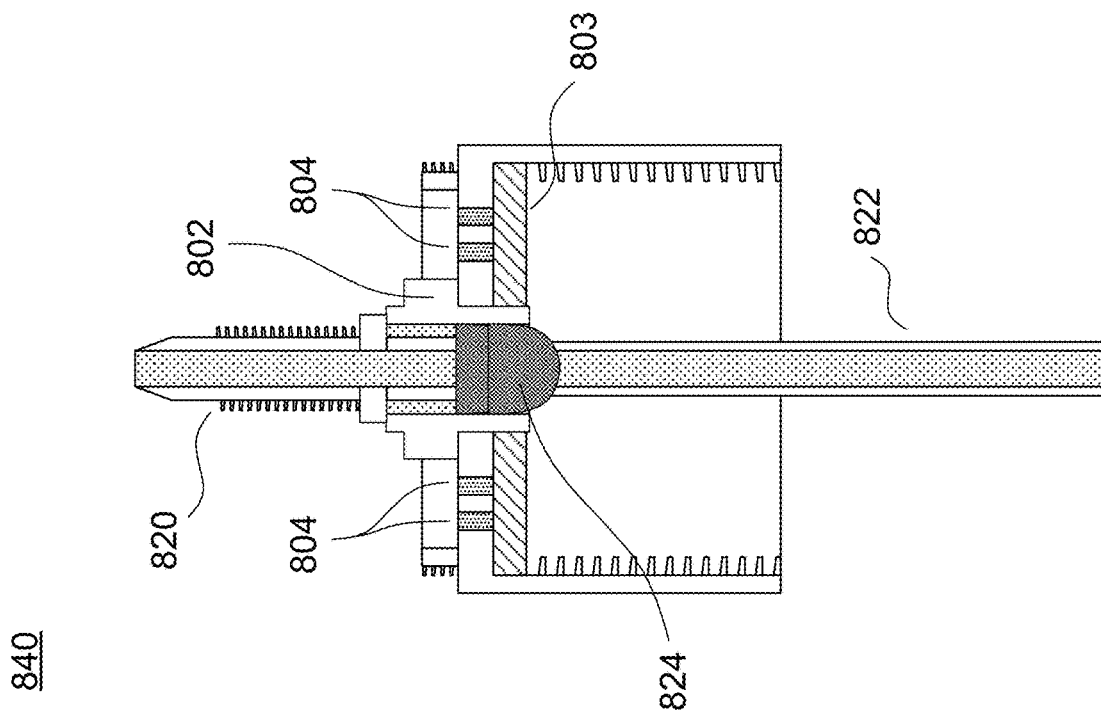
FIG. 8F depicts a storage and delivery system configured for use, wherein the removable downtube of FIG. 8C is interfaced with the bottle closure device of FIG. 8A.
Figure 8E:
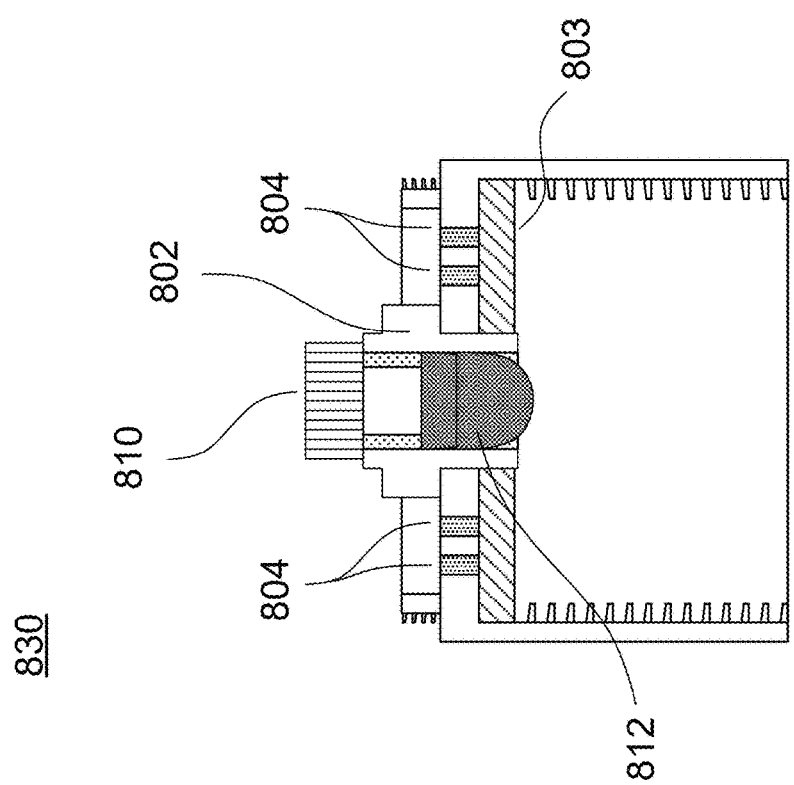
FIG. 8E depicts a bottle closure assembly configured for transport and storage, wherein the closure cap of FIG. 8B is interfaced with the bottle closure device of FIG. 8A.

FIG. 8E shows the bottle closure assembly 830 configured for transport and storage. Closure cap 810 has been interfaced with universal attachment 802. Sealant rings 812 form a liquid seal within universal attachment 802 which prevents the release of a contained chemical formulation. If flexible sealant rings are used, the rings may deform to provide a liquid seal. Otherwise, the rings must be shaped such as to properly fill attachment 802 and prevent liquid from escaping. While in transport and storage state 830, the head space removal operation illustrated in FIG. 4C may still be used when attached to a variable volume container. Gas may be added or removed through vents 804 and membrane 803 while the membrane prevents the release of a contained chemical formulation. While not shown, a protective cap, such as is depicted in FIG. 3C, may be secured to bottle closure device 800 which may, in some cases, provide protection for the membrane 803 and bottle closure device 800.

FIG. 8F shows the storage and delivery system 840 configured for use, according to the methods of the present disclosure. Storage and delivery system 840 comprises bottle closure device 800 and removable downtube 820. In some applications, a container is stored and transported to the point of use while in the state depicted in FIG. 8E. Once there, closure cap 810 of FIG. 8E may be removed and replaced with a removable downtube, such as removable downtube 820. Removable downtube 820 is interfaced with universal attachment 802 and sealant rings 824 form a liquid seal within universal attachment 802, which prevents the release of a chemical formulation. Downtube 822 may have any shape or size as required for a specific application, and may be either rigid or flexible. In this state, emptying operations shown in FIGS. 6A-6C may be used to drive the solution out of the container, for instance, to be used in production, as well as the filling operations of FIGS. 4A-4D and 5A-5D. If a dispenser cap, such as dispenser cap 310 depicted in FIG. 3B, is attached to removable downtube 820, the head space removal operation illustrated in FIG. 4C may also be used. Despite reducing the particle generation compared to the configuration shown in FIGS. 7A-E, the representation shown in FIGS. 8A-F may still be unsuited for high-purity applications due to friction between sealant rings 824 and universal attachment 802, but may provide a rapid and simple method for accessing a chemical formulation.

FIGS. 9A-9G depict a third storage and delivery system with a removable downtube, according to the methods of the present disclosure, which is capable of meeting high-purity standards such as those required for CMOS manufacturing. The storage and delivery system of FIGS. 9A-9G comprises bottle closure device 900, closure cap 910 and removable downtube 920, in addition to, optionally, a dispenser cap and protective cap such as those illustrated in FIGS. 3B and 3C, respectively, which are not shown. While bottle closure device 900 is illustrated without the dispenser cap attachment 303 shown in FIG. 3A, such an attachment may be included, depending on the needs of a particular application. This third storage and delivery system is distinguished by the use of an external attachment mechanism to interface bottle closure device 900 with removable fittings, such as a downtube 920, closure cap 910 or a custom dispenser nozzle. While particles may still be generated during the securement and removal of fittings, these particles may not come in contact with a contained chemical formulation. In this way, a storage and delivery system is provided which can meet the standards of high-purity applications such as CMOS manufacturing.

Figure 9C:
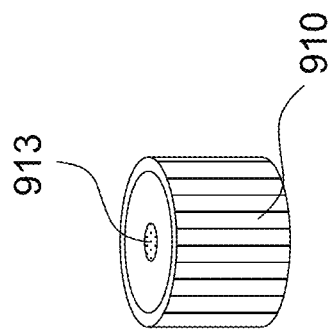
FIG. 9C is a 3D view of the closure cap of FIG. 9B.
Figure 9B:
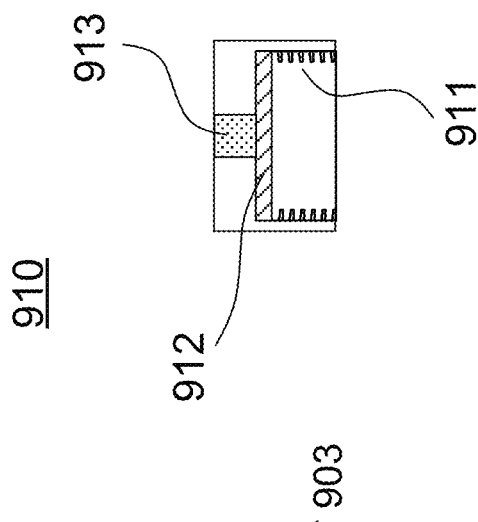
FIG. 9B depicts a closure cap for use with the bottle closure device of FIG. 9A comprising an attachment mechanism, semi-permeable membrane and vent.
Figure 9A:
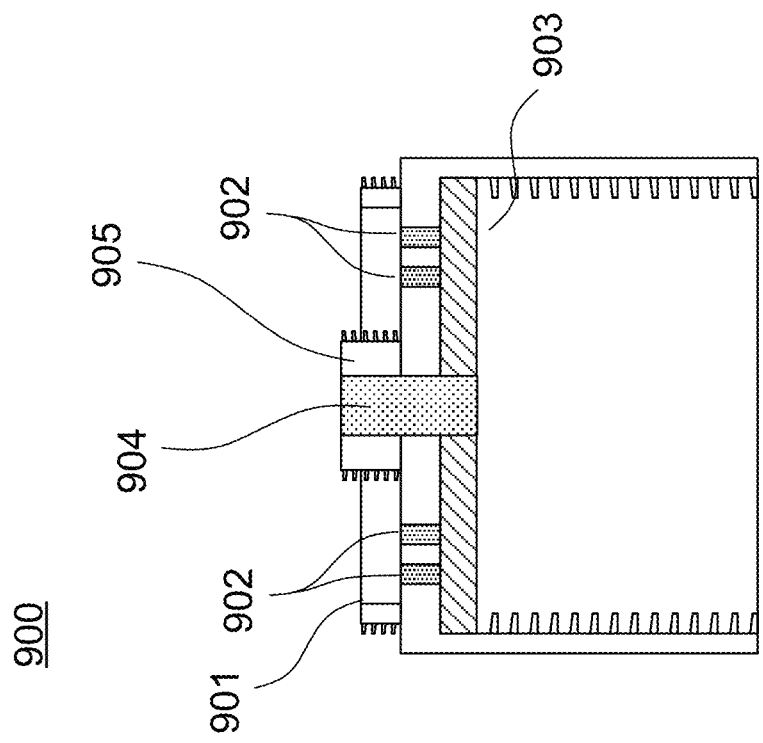
FIG. 9A depicts a third bottle closure device which permits the use of a removable downtube, comprising a primary cap ring, vents, semi-permeable membrane, access port and a universal attachment with an external attachment mechanism.

FIG. 9A depicts bottle closure device 900, comprising primary cap ring 901, vents 902, semi-permeable membrane 903 and universal attachment 905. Access port 904 passes through the device to permit a variety of downtube sizes and shapes. Unlike the representation shown in FIGS. 7A-E, the attachment mechanism used in universal attachment 905 is external rather than internal. Although particles may still be generated during attachment and removal of fittings, they may not contaminate a contained chemical formulation. While the attachment mechanism of universal attachment 905 is illustrated as a screw-type attachment for ease of explanation, the present disclosure is not limited in this regard. Indeed, any suitable attachment mechanism which provides a liquid seal may be used to secure fittings to universal attachment 905.

FIG. 9B shows closure cap 910, comprising attachment mechanism 911, semipermeable membrane 912 and vent 913. Since the access port 904 in FIG. 9A may be substantially large, the ability to vent through the cap may be required. As described similarly in FIGS. 4A-5D and FIGS. 5A-5D, gas may be displaced by liquid through vent 913. Headspace may be substantially eliminated by raising the surface of a contained chemical formulation to contact membrane 912. In certain applications, if access port 904 is sufficiently small to neglect the headspace in closure cap 910, or closure cap 910 is designed such as to substantially limit the headspace, vent 913 may be removed and semipermeable membrane 912 may be replaced with a sealant mechanism. Alternatively, in some aspects of the present disclosure, a sealant mechanism may be used in combination with a semipermeable membrane. This sealant mechanism may be, for instance, a sealant ring or coating composed of materials selected to repel a certain chemical formulation. Thus in some applications, for example, to contain an aqueous solution, a hydrophobic material such as PTFE or PFA may be selected. In others, for example, an impermeable membrane or rubber sealant ring may be selected, but the present disclosure is not limited in this regard. Indeed, any material, materials, or mechanism may be used to provide a liquid seal between closure cap 910 and bottle closure device 900.

FIG. 9C shows a 3D view of closure cap 910, clearly indicating vent 913. As discussed previously, in certain applications where the headspace introduced by closure cap 910 is sufficiently small, vent 913 may not be required. Closure cap 910 may provide substantially zero headspace, or an amount of headspace sufficiently small to prevent substantial defect formation. In these cases, closure cap 910 may not require a semipermeable membrane or vent 913.

Figure 9E:
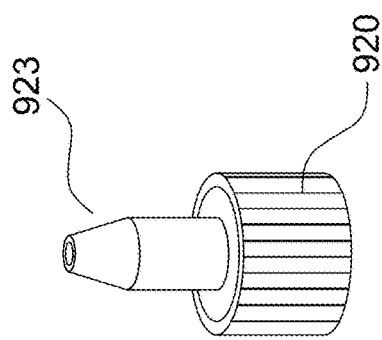
FIG. 9E depicts the removable downtube of FIG. 9D without a downtube.
Figure 9D:
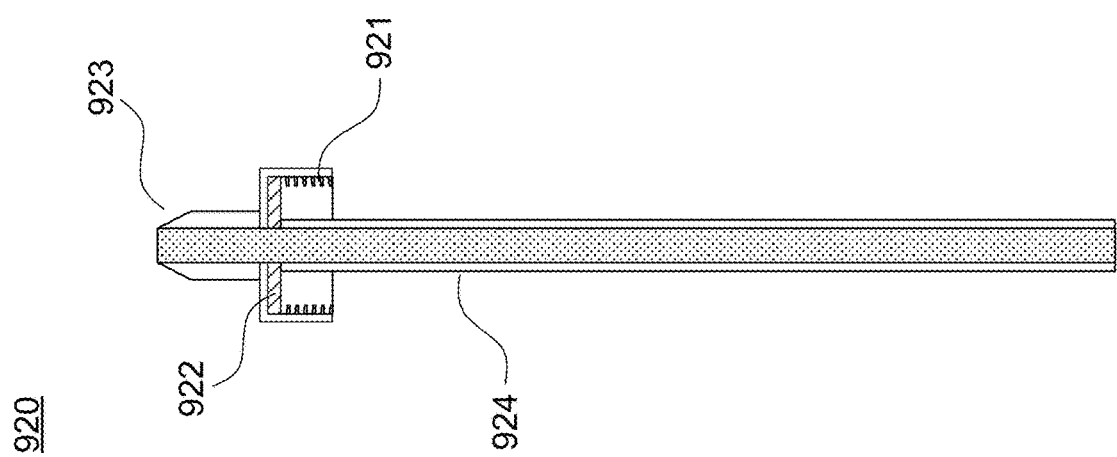
FIG. 9D depicts a removable downtube for use with the bottle closure device of FIG. 9A, comprising an attachment mechanism, sealant mechanism, dispenser nozzle and downtube.

FIG. 9D depicts a removable downtube 920, comprising attachment mechanism 921, sealant mechanism 922, dispenser nozzle 923 and downtube 924. Sealant mechanism 922 provides a liquid seal when removable downtube 920 is secured to a bottle closure device. Sealant mechanism 922 may be composed of materials selected to contain a certain chemical formulation. Thus, in some applications, sealant mechanism 922 may have a hydrophobicity selected to repel the contained chemical formulation, preventing leakage of the liquid and potential contamination. It should be noted that the present disclosure is not limited, in the manner by which sealant mechanism 922 contains a certain chemical formulation, and a number suitable sealing method will be apparent to those skilled in the art. The dispenser nozzle 923 and downtube 924 shown are exemplary and may have any shape or size, and may be removed altogether, in order to meet the requirements of certain applications, for instance, to interface with certain manufacturing equipment. Although removable downtube 920 is shown without a dispenser cap attachment, such as the dispenser cap attachment 303 shown in FIG. 3A, this attachment may be added in certain applications, for instance, where multiple dispensing operations are required. Similarly, FIG. 9E shows removable downtube 920 without a downtube, which may be removed to facilitate, for instance, a gravity fed system or a manual use squeeze bottle.

FIG. 9F shows storage and delivery system 930 in a state suitable for transport or storage. Storage and delivery system 930, in this state, comprises bottle closure device 900 and closure cap 910. Closure cap 910 has been interfaced with universal attachment 905. The headspace removal operation illustrated in FIG. 4C may be used in this state to prepare an attached container for transport and storage. Gas may be displaced by liquid up to membrane 903 and through vents 902 in order to substantially eliminate the headspace. Unlike the configuration shown in FIG. 3A however, headspace may also be removed from the space below the cap through vent 913. This may require de-pressurization of the container before the cap may be removed. As discussed previously, however, vent 913 is optional and the headspace may be neglected if it is sufficiently small. The smaller form factor of closure cap 910 may also help prevent damage to the bottle closure device.

FIG. 9G shows a storage and delivery system 940, according to the methods of the present disclosure, in a state suitable for use in dispensing and filling operations. Storage and delivery system 940 comprises bottle closure device 900 and removable downtube 920. Removable downtube 920 has been interfaced with universal attachment 905 by attachment mechanism 921. Downtube 924 is shown as extending into the bottle, however, as discussed previously, the downtube may be of any shape or size and may be omitted completely, according to the requirements of a specific application. When the storage and delivery system is in state 940, the emptying operations illustrated in FIGS. 6A-6C may be used to release a contained chemical formulation through dispenser nozzle 923, and the filling operations of FIGS. 5A-5D may be used to fill an attached storage vessel.

FIGS. 10A-10F depict a fourth storage and delivery system with a removable downtube, according to the methods of the present disclosure. The storage and delivery system of FIGS. 10A-10F comprises bottle closure device 1000, removable downtube 1010 and closure cap 1020, in addition to, optionally, a dispenser cap and protective cap such as those illustrated in FIGS. 3B and 3C, respectively, which are not shown. This fourth storage and delivery system is distinguished by the use of sealant rings and a loose attachment mechanism, such as a nut, to secure removable fittings, such as a downtube 1010, closure cap 1020 or a custom dispenser nozzle, to bottle closure device 1000.

FIG. 10A depicts a fourth bottle closure device 1000 for use with removable fittings, which is devoid of a removable fitting attachment mechanism. Bottle closure device 1000 comprises primary cap attachment 1001, universal attachment 1002, semi-permeable membrane 1003, vents 1004, and access port 1005. Similar to bottle closure device 800 depicted in FIG. 8A, access port 1005 is devoid of an attachment mechanism. The diameter of access port 1005 may be selected to enable the securement of a variety of removable fittings, such as downtube 1010, sealant cap 1020 or a custom dispenser nozzle to bottle closure device 1000. Additionally, universal attachment 1002 may be designed so as to improve the liquid seal between bottle closure device 1000 and a removable fitting, for instance, by having a grooved inset to improve contact with a sealant ring.

FIG. 10B illustrates an exemplary removable downtube 1010 for use with bottle closure device 1000. Removable downtube 1010 comprises main body 1011, downtube 1012, dispenser nozzle 1013, bottle closure device attachment 1014, dispenser cap attachment 1015, and sealant ring 1016. Downtube 1012 may be of any size or shape and may be either rigid or flexible, as required for a specific application. Similarly, dispenser nozzle 1013 may have any size or shape, as required for a specific application. In certain applications, dispenser cap attachment 1015 may be unnecessary and may be removed. Unlike the removable downtubes depicted in FIGS. 7B, 8C and 9C, removable downtube 1010 is secured to bottle closure device 1000 by means of a loose attachment mechanism, such as a nut, which is secured to bottle closure device attachment 1014. Sealant ring 1016 provides a liquid seal between removable downtube 1010 and bottle closure device 1000, and may be composed of materials selected to repel a certain chemical formulation. For example, to repel an aqueous chemical formulation, sealant ring 1016 may be composed of a hydrophobic material such as PTFE or PFA, or a rubber ring. Sealant ring 1016 may be either loose, such as an O-ring, or attached to removable downtube 1010.

FIG. 10C shows an exemplary closure cap 1020 designed for use with bottle closure device 1000. Closure cap 1020 comprises main body 1021, closure knob 1022, bottle closure device attachment 1023, and sealant ring 1024. As described previously with reference to FIG. 10B, closure cap 1020 may be secured to bottle closure device 1000 by means of a loose attachment mechanism, such as a nut, which is secured to bottle closure device attachment 1023. Sealant ring 1024 provides a liquid seal between closure cap 1020 and bottle closure device 1000, and may be composed of materials selected to repel a certain chemical formulation. For example, to repel an aqueous chemical formulation, sealant ring 1024 may be composed of a hydrophobic material such as PTFE or PFA, or a rubber ring. Sealant ring 1023 may be either loose, such as an O-ring, or attached to removable downtube 1024.

Figures 10D, 10E:
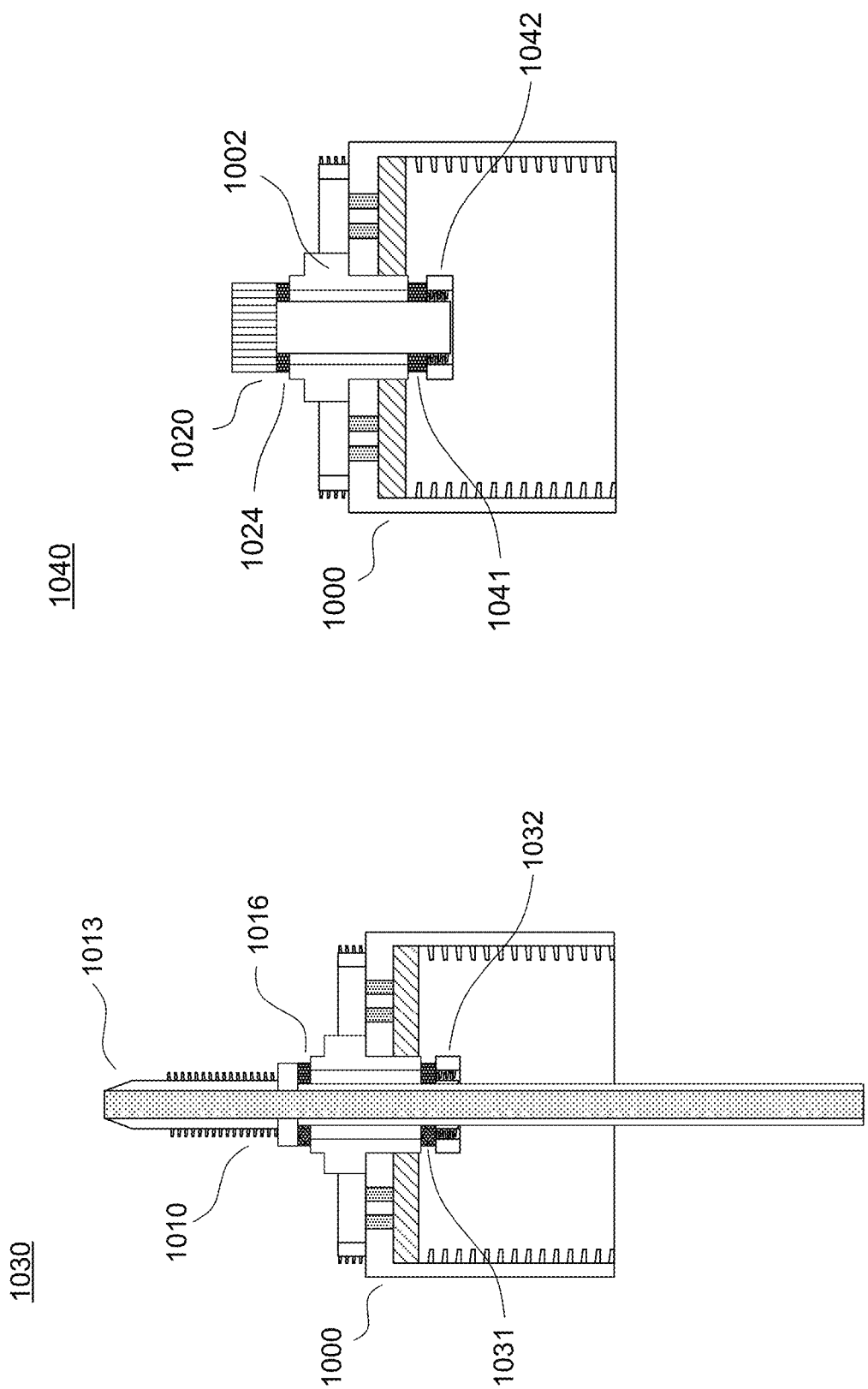
FIG. 10D depicts a storage and delivery system in a state ready for dispensing and filling operations, wherein the removable downtube of FIG. 10B has been secured to the bottle closure device of FIG. 10A.
FIG. 10E depicts a storage and delivery system in a state suitable for transport and storage, wherein the closure device of FIG. 10C has been secured to the bottle closure device of FIG. 10A.

FIG. 10D depicts storage and delivery system 1030 in a state ready for dispensing and filling operations, according to the methods of the present disclosure. Storage and delivery system 1030 comprises bottle closure device 1000 and removable downtube 1010, which has been secured to bottle closure device 1000 by means of sealant ring 1031 and loose attachment mechanism 1032. Loose attachment mechanism 1032 has been interfaced with the bottle closure device attachment 1016 of removable downtube 1010, shown in FIG. 10B, and may not be directly attached to bottle closure device 1000. Sealant ring 1031 provides a liquid seal between loose attachment mechanism 1032 and bottle closure device 1000, while sealant ring 1016 provides a liquid seal between removable downtube 1010 and bottle closure device 1000. When the storage and delivery system is in state 1030, the emptying operations illustrated in FIGS. 6A-6C may be used to release a contained chemical formulation through dispenser nozzle 1013, and the filling operations of FIGS. 5A-5D may be used to fill an attached storage vessel.

FIG. 10E depicts storage and delivery system 1040 in a state suitable for transport and storage. Storage and delivery system 1040 comprises bottle closure device 1000 and closure cap 1020, which has been secured to bottle closure device 1000 by sealant ring 1041 and loose attachment mechanism 1042. Loose attachment mechanism 1042 has been interfaced with the bottle closure device attachment 1023 of closure cap 1020, shown in FIG. 10C, and may not be directly attached to bottle closure device 1000. Sealant ring 1041 provides a liquid seal between loose attachment mechanism 1042 and bottle closure device 1000, while sealant ring 1024 provides a liquid seal between closure cap 1020 and bottle closure device 1000. While in state 1040, the headspace removal operation illustrated in FIG. 4C may be employed to prepare the storage and delivery system for transport and storage.

Figure 10F:
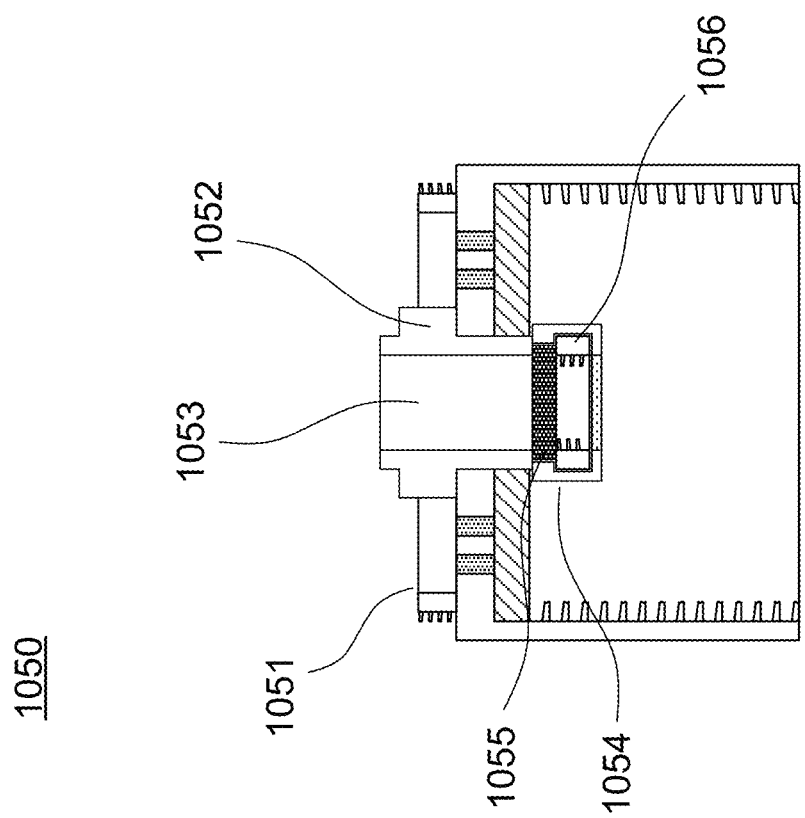
FIG. 10F depicts a alternative bottle closure device compatible with the removable downtube of FIG. 10B and closure cap of FIG. 10C including an encasement.

FIG. 10F shows an alternative bottle closure device 1050 which is compatible with removable downtube 1010 and closure cap 1020. In this case, sealant ring 1055 and loose attachment mechanism 1056 are constrained to bottle closure device 1050 by means of encasement 1054. Encasement 1054 prevents loose attachment mechanism 1056 and sealant ring 1055 from becoming separated from bottle closure device 1050. In certain applications, this may improve the securement of a removable fittings to bottle closure device 1050, and may improve the effectiveness of the liquid seal. Bottle closure devices 1050 and 1000 (shown in FIG. 10A) may be used interchangeably in certain applications.

Figure 11:
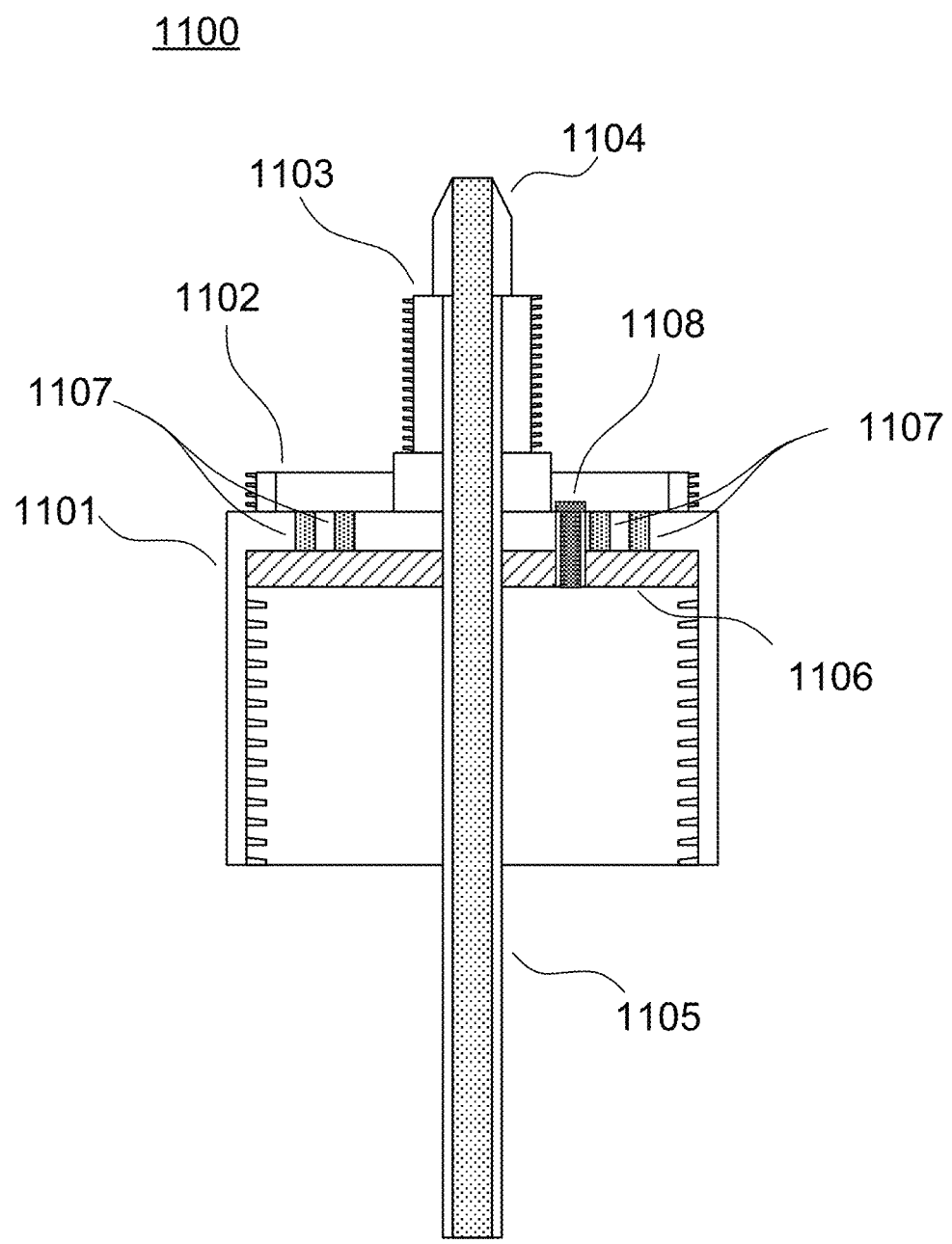
FIG. 11 depicts a bottle closure device according to the methods of the present disclosure with a bypass valve.

FIG. 11 shows a bottle closure device 1100, comprising main body 1101, primary cap attachment 1102, dispenser cap attachment 1103, dispenser nozzle 1104, downtube 1105, semi-permeable membrane 1106 and vents 1107, in addition to bypass vent 1108. Bypass vent 1108 penetrates through the bottle closure device and membrane, providing a clear access port for gas and liquid to flow when opened. Bypass vent 1108 may be necessary if membrane 1106 or vents 1107 become clogged and the container cannot be depressurized. When not in use, this vent may be closed to form a liquid seal. Although bottle closure device 1100 is depicted using a configuration similar to that shown in FIG. 3A, bypass vent 1108 may be used in combination with any aspects of the present disclosure.

Figure 12:
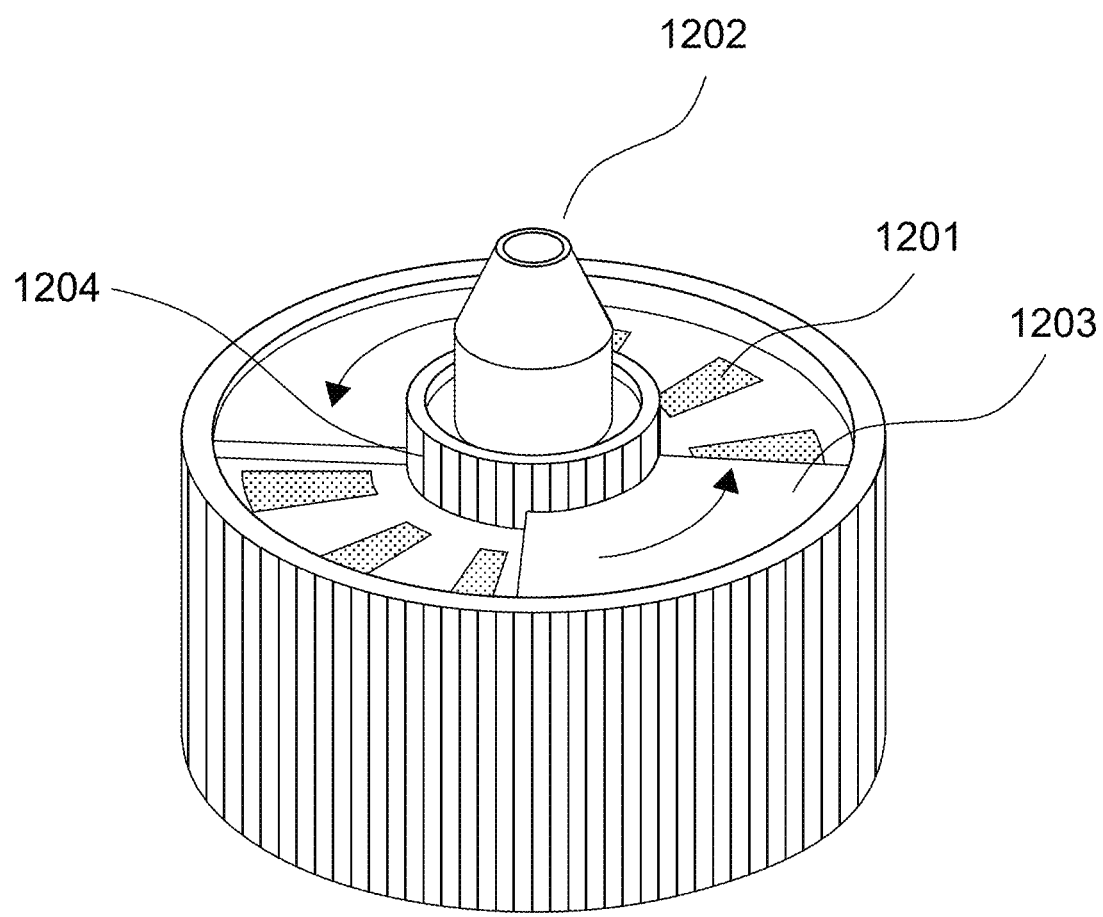
FIG. 12 depicts a bottle closure device according to the methods of the present disclosure with vent cover.

Similarly, FIG. 12 shows a vent closure mechanism 1204 which may prevent clogging or damage to vents 1201, which may be used in combination with any of the previous representations of a bottle closure device. Vent closure mechanism 1204 surrounds dispenser nozzle 1202, which may be removable, as described previously with reference to FIGS. 7A-7E, 8A-8F, and 9A-9G. During transport and storage, vent closure mechanism 1204 may be rotated to substantially cover vents 1201 in order to provide protection from, for instance, dirt, liquid and puncturing. The present disclosure is not limited in the degree of rotation, and rotation of vent closure mechanism 1204 may be free or constrained. As with the bypass vent of FIG. 11, vent closure mechanism 1204 may be used in combination with any of the previous representations of a bottle closure device, and may be used in conjunction with the protective cap depicted in FIG. 1C to provide additional protection.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A method for reducing defect formation in a colloidal dispersion, comprising:
    providing a colloidal dispersion;
    filling a container with said colloidal dispersion;
    substantially eliminating fluid interfaces within said colloidal dispersion by fully displacing headspace within said container with said colloidal dispersion; and
    securing said container to maintain said colloidal dispersion in a state substantially free of said fluid interfaces.

2. The method of claim 1 wherein said fluid interfaces are one of a liquid-gas interface or a liquid-liquid interface.

3. The method of claim 1 wherein said eliminating step comprises removing bubbles from said colloidal dispersion.

4. The method of claim 1 further comprising placing said filled and secured container into an environment of inert gas subsequent to said securing step.

5. The method of claim 1 wherein said colloidal dispersion forms agglomerates when subjected to vibration.

6. The method of claim 1 wherein said colloidal dispersion comprises a dispersion of nanoscopic elements.

7. The method of claim 6 wherein said nanoscopic elements are structured nanoscopic elements.

8. The method of claim 7 wherein said nanoscopic elements are carbon nanotubes.

9. The method of claim 1 further comprising degassing said dispersion prior to said filling step and maintaining said dispersion in a degassed state.

10. The method of claim 1 wherein said step of maintaining said colloidal dispersion in a state substantially free of said fluid interfaces prevents the formation of agglomerates.

11. The method of claim 1 wherein said step of maintaining said colloidal dispersion in a state substantially free of said fluid interfaces prevents the formation of defects in a film subsequently formed from said dispersion.

12. The method of claim 1 wherein said colloidal dispersion within said secured container is substantially resistant to vibration.

13. The method of claim 12 wherein said colloidal dispersion is resistant to vibration for between 1 and 5 hours.

14. The method of claim 12 wherein said colloidal dispersion is resistant to vibration for between 5 and 10 hours.

15. The method of claim 12 wherein said colloidal dispersion is resistant to vibration for between 10 and 24 hours.

16. The method of claim 12 wherein said colloidal dispersion is resistant to vibration for at least 24 hours.

17. The method of claim 1 further comprising depositing said colloidal dispersion onto a material substrate to form a substantially uniform film.

18. The method of claim 17 wherein said film is a nanotube fabric.

19. The method of claim 1 wherein said container is a variable volume container.

20. The method of claim 19 wherein said eliminating step comprises reducing the volume of said variable volume container.

* * * * *